(12) United States Patent
Suda et al.

(10) Patent No.: US 8,240,235 B2
(45) Date of Patent: Aug. 14, 2012

(54) METHOD OF MINIMAL QUANTITY LUBRICATION CUTTING/GRINDING PROCESSING AND OIL COMPOSITION USED THEREFOR

(75) Inventors: Satoshi Suda, Yokohama (JP); Masahiro Hata, Yokohama (JP); Masanori Ibi, Yokohama (JP); Ichiro Inasaki, Yokosuka (JP); Toshiaki Wakabayashi, Takamatsu (JP)

(73) Assignee: Nippon Oil Corporation, Tokyo (JP)

( * ) Notice: Subject to any disclaimer, the term of this patent is extended or adjusted under 35 U.S.C. 154(b) by 541 days.

(21) Appl. No.: 12/440,607

(22) PCT Filed: Jul. 27, 2007

(86) PCT No.: PCT/JP2007/065208
§ 371 (c)(1),
(2), (4) Date: Mar. 10, 2009

(87) PCT Pub. No.: WO2008/032504
PCT Pub. Date: Mar. 20, 2008

(65) Prior Publication Data
US 2010/0011923 A1   Jan. 21, 2010

(30) Foreign Application Priority Data

Sep. 11, 2006  (JP) .................. 2006-245300

(51) Int. Cl.
*B26D 7/08* (2006.01)
*B24B 49/00* (2006.01)
*C10M 105/32* (2006.01)

(52) U.S. Cl. ................. 83/22; 83/169; 451/7; 508/463

(58) Field of Classification Search ............. 83/22, 169; 451/7; 508/463
See application file for complete search history.

(56) References Cited

U.S. PATENT DOCUMENTS

| | | |
|---|---|---|
| 3,805,918 A | 4/1974 | Altgelt et al. |
| 4,477,383 A | 10/1984 | Beimesch et al. |
| 4,589,990 A | 5/1986 | Zehler et al. |
| 4,601,840 A | 7/1986 | Zehler et al. |
| 4,655,947 A | 4/1987 | Tsai et al. |
| 4,812,248 A | 3/1989 | Marwick |
| 5,171,903 A | 12/1992 | Koyama et al. |

(Continued)

FOREIGN PATENT DOCUMENTS

JP          08-208814 A       8/1996

(Continued)

OTHER PUBLICATIONS

English Translation of Int'l Search Report issued on Jan. 16, 2001 in Int'l Application No. PCT/JP00/06978 (English Translation attached).

(Continued)

*Primary Examiner* — Walter D Griffin
*Assistant Examiner* — Vishal Vasisth
(74) *Attorney, Agent, or Firm* — Panitch Schwarze Belisario & Nadel LLP

(57) ABSTRACT

The present invention provides a method of minimal quantity lubrication cutting and grinding that can improve cutting and grinding properties and extend the life of tools. The minimal quantity lubrication cutting and grinding method of the present invention comprises supplying a compressed fluid containing 0.1 to 15 percent by volume of oxygen together with a cutting and grinding oil (particularly preferably an oil composition comprising an ester) to processing spots of a workpiece.

4 Claims, 1 Drawing Sheet

U.S. PATENT DOCUMENTS

| | | |
|---|---|---|
| 5,226,506 A | 7/1993 | Link |
| 5,493,886 A | 2/1996 | Graham |
| 5,756,430 A | 5/1998 | Zielinski |
| 5,877,130 A | 3/1999 | Kohara et al. |
| 5,895,778 A | 4/1999 | McHenry et al. |
| 6,085,782 A | 7/2000 | Ott |
| 6,245,723 B1 | 6/2001 | Sigg et al. |
| 6,300,293 B1 | 10/2001 | Lamberth |
| 6,326,338 B1 | 12/2001 | Garrett |
| 6,858,569 B2 | 2/2005 | Yokota et al. |
| 2002/0035043 A1* | 3/2002 | Yokota et al. ............ 508/485 |
| 2004/0116308 A1 | 6/2004 | Yokota et al. |
| 2006/0247139 A1* | 11/2006 | Skerlos et al. ............ 508/154 |

FOREIGN PATENT DOCUMENTS

| | | |
|---|---|---|
| JP | 09-263783 A | 10/1997 |
| JP | 10-279978 A | 10/1998 |
| JP | 10-292187 A | 11/1998 |
| JP | 10-324887 A | 12/1998 |
| JP | 11-165237 A | 6/1999 |
| JP | 11-216636 A | 8/1999 |
| JP | 11-246881 A | 9/1999 |
| JP | 2000-073078 A | 3/2000 |
| JP | 2000-073079 A | 3/2000 |
| JP | 2000-160184 A | 6/2000 |
| JP | 2004-306222 A | 11/2004 |
| JP | 2005-286022 A | 10/2005 |
| WO | 02/083823 A1 | 10/2002 |

OTHER PUBLICATIONS

U.S. Office Action issued Dec. 19, 2001 in U.S. Appl. No. 09/891,486.

U.S. Office Action issued Oct. 4, 2002 in U.S. Appl. No. 09/891,486.

U.S. Office Action issued Mar. 17, 2003 in U.S. Appl. No. 09/891,486.

U.S. Office Action issued Jun. 5, 2003 in U.S. Appl. No. 09/891,486.

U.S. Office Action issued Jul. 18, 2003 in U.S. Appl. No. 09/891,486.

* cited by examiner

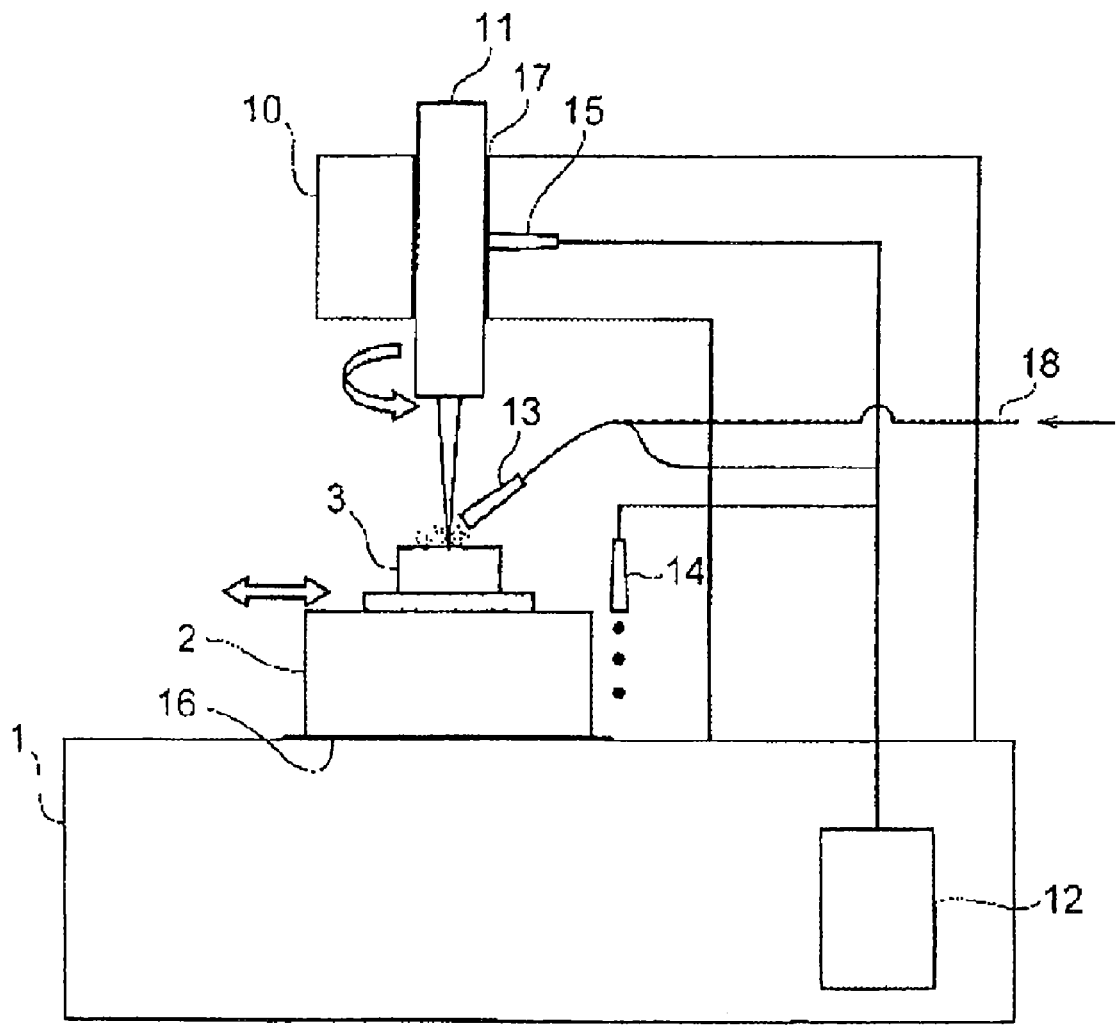

US 8,240,235 B2

METHOD OF MINIMAL QUANTITY LUBRICATION CUTTING/GRINDING PROCESSING AND OIL COMPOSITION USED THEREFOR

CROSS-REFERENCE TO RELATED APPLICATION

This application is a Section 371 of International Application No. PCT/JP2007/065208, filed Jul. 27, 2007, which was published in the Japanese language on Mar. 20, 2008, under International Publication No. WO 2008/032504 A1, and the disclosure of which is incorporated herein by reference.

FIELD OF THE INVENTION

The present invention relates to a method of cutting and grinding with a minimal quantity lubrication system, more specifically to a method of cutting and grinding a workpiece, supplying a minimal quantity of oil to processing spots of a workpiece together with a compressed fluid containing 0.1 to 15 percent by volume of oxygen and a cutting and grinding oil composition for use in such a method.

BACKGROUND ART

In cutting and grinding processing, cutting and grinding oils have been used in order to extend the working life of tools such as drills, end mills, tool bits, grinding stones and the like, improve the roughness of the finished surface of a workpiece, and improve processing efficiency thereby, resulting in an improvement in the productivity of machining.

Cutting or grinding oils are roughly classified into two types of oils, i.e., water-soluble oils which are put in use after diluting the surface-active agent and lubricant component contained therein with water, and water-insoluble oils which contain a mineral oil as a main component and are used as it is, i.e., in the form of a stock solution. In the conventional cutting and grinding processing, a relatively large amount of a cutting and grinding oil is supplied to processing spots of a workpiece regardless of which type of oil is used.

The most basic and important functions of the cutting and grinding oils are lubricating and cooling properties. Generally speaking, water-insoluble cutting and grinding oils are superior in lubricating properties, while water-soluble ones are superior in cooling properties. Since the cooling properties of the water-insoluble cutting and grinding oils are inferior to that of the water-soluble ones, it is necessary to supply the water-insoluble cutting and grinding oil in large amounts, ranging from several liters to over ten liters per minute.

Cutting and grinding oils which are effective in improving processing efficiency have undesirable aspects, from different viewpoints. The typical examples of such aspects are problems concerning with the environment. Regardless of whether water-soluble or water-insoluble, the oils are gradually deteriorated during the use thereof and finally become incapable of further use. For instance, a water-soluble oil becomes unable to be used when it undergoes the separation of the components or deteriorates the environment in terms of sanitary, caused by deteriorated stability due to the growth of microorganisms. A water-insoluble oil becomes unusable when the acidic components generated with the progress of oxidation make workpieces corrode, or the viscosity is significantly changed. Furthermore, the oil is spent by adhering to metal chips or swarf and becomes wastes.

In such a case, the deteriorated oil is disposed and then replaced with a fresh oil. The oil disposed as wastes is necessarily subjected to various treatments so as to avoid adverse affects on the environment. For instance, cutting or grinding oils which are developed for the primary purpose of improving working efficiency, contain a large amount of chlorine-containing components which may generate harmful dioxin during thermal disposal. Therefore, removal of such components is required. For the reason of this, cutting or grinding oils which are free of chlorine-containing components have been developed. However, even though the oils contain no chlorine-containing component, they would adversely affect the environment, if their waste disposal volume is large. The water-soluble oils may pollute the surrounding water area, and are, therefore, necessarily subjected to highly-developed treatments that require large costs.

The field of manufacturing nonferrous metal parts to be used in automobiles and home electric appliances is cited as one example where it is difficult to achieve both an improvement in cutting and grinding properties and a reduction in burdens on the environment. More specifically, when nonferrous metal parts such as those of aluminum or aluminum alloys are processed, water-soluble oils have been generally used, but the waste oils resulting from the processing often contain metals dissolved therein and thus leads to a problem that disposal of the waste oils entails enormous cost. Further, the use of the water-soluble oils require strict and tedious adjustments in pH because the use of an oil with an inappropriate pH would decompose or cause corrosion on the surfaces of parts.

In the nonferrous metal processing industry, the use of dry processing or water-insoluble oils has been studied in order to solve the foregoing problems.

On the other hand, a minimal quantity lubrication cutting and grinding processing method has been developed to provide a novel processing method. This method is carried out by supplying oil in a trace amount of $1/100000$ to $1/1000000$ of the amount of oil used for conventional cutting and grinding to processing spots together with a compressed fluid (for example, compressed air). This system can obtain a cooling effect with compressed air and can reduce the amount of wastes due to the use of a minimal quantity of oil, resulting in a reduction in adverse affects on the environment that is caused by large amounts of waste disposal. Therefore, this method has been expected to be used for processing not only nonferrous metals but also ferrous metals or any other metals.

The minimal quantity lubrication system is required to provide a processed product with excellent surfaces even though the amount of oil to be supplied is minimal, to reduce the wear of tools, and to carry out cutting and grinding efficiently. Therefore, the cutting and grinding oil used for the system is required to have high quality properties. The oil is desirously an oil with excellent biodegradability in view of waste disposal and working environments.

In the minimal quantity lubrication system, it is very important to generate excellent oil mist. Oil mist if in poor state causes plugging of piping and thus fails to reach processing spots sufficiently, resulting in the tendency that the cutting and grinding properties are degraded or the working life of tools is shortened. Whereas, if oil is likely misted excessively, it would scatter and pollute the working environment when pumped out. Also in this case, oil mist scatters and thus fails to reach processing spots sufficiently, resulting in the tendency that the cutting and grinding properties are degraded or the working life of tools is shortened.

Further, in the minimal quantity lubrication system, the oil is supplied in the form of mist. Therefore, if an oil with a poor stability is used, the oil likely adheres to the interior of a working machine, a workpiece, the inside of a mist collector and the like, i.e., causes "sticking phenomenon". As the result, the oil invites a problem in treatability and reduces the working efficiency. Therefore, in the minimal quantity lubrication system, it is desirous to use an oil that unlikely becomes sticky.

In the conventional minimal quantity lubrication cutting and grinding method, it has been common to use a compressed air as a compressed fluid (see WO2002/083823). However, it has been frequently observed that in nonferrous metal processing in particular, processing using a compressed air may not be sufficient in cutting and grinding properties.

DISCLOSURE OF THE INVENTION

As described above, in minimal quantity lubrication cutting and grinding processing, it is often very difficult to satisfy all the above-described requisite properties in a well-balanced manner even when air is used as an compressed fluid like in a conventional method or when a conventional oil for cutting and grinding is used in a minimal quantity lubrication system as it is. When a minimal quantity lubrication system is used and the workpiece is a nonferrous metal, it is not always easy to avoid damages of tools caused by adhesion of the nonferrous metal or increased resistance in processing.

The present invention was made in view of the current situations and has an object to provide a method of minimal quantity lubrication cutting and grinding processing that can improve cutting and grinding properties and extend the life of tools and a oil composition for minimal quantity lubrication cutting and grinding, used in the method.

As the result of extensive study and research, the present invention was accomplished on the basis of the finding that the above object was achieved using a fluid with less oxygen content as a compressed fluid, in particular in combination with an ester-containing oil composition as a minimal quantity lubrication cutting and grinding oil enables the formation of excellent oil mist and can inhibit adhesion of workpiece materials on tools or increase in processing resistance, thereby improving cutting and grinding properties and extending the life of tools.

That is, the present invention relates to a method of minimal quantity lubrication cutting and grinding comprising supplying a compressed fluid containing 0.1 to 15 percent by volume of oxygen together with a cutting and grinding oil to processing spots of a workpiece.

The present invention also relates to the method of minimal quantity lubrication cutting and grinding wherein the cutting and grinding oil contains an ester.

The present invention also relates to the method of minimal quantity lubrication cutting and grinding wherein the cutting and grinding oil further contains an oiliness improver.

The present invention also relates to the method of minimal quantity lubrication cutting and grinding wherein the workpiece is a nonferrous metal.

The present invention also relates to a minimal quantity lubrication cutting and grinding oil composition containing an ester wherein the composition is used in a method of minimal quantity lubrication cutting and grinding where a compressed fluid containing 0.1 to 15 percent by volume of oxygen is supplied.

Effects of the Invention

The present invention enables the formation of excellent oil mist and also can inhibit nonferrous metals (in particular aluminum) from adhering on tools and increase in processing resistance thereby improving cutting and grinding properties and extending the life of tools.

BRIEF DESCRIPTION OF DRAWING

FIG. 1 is schematic view illustrating one example of a working machine which is suitably used in a minimal oil quantity lubrication cutting and grinding method.

BEST MODE FOR CARRYING OUT THE INVENTION

The present invention will be described in more detail below.

The method of minimal quantity lubrication cutting and grinding according to the present invention is characterized in that a compressed fluid containing 0.1 to 15 percent by volume of oxygen is supplied to processing spots of a workpiece, together with a cutting and grinding oil. Generally, it is common to use a compressed air as a fluid to be used together with oil in a conventional cutting and grinding processing with a minimal quantity lubrication system. However, the present invention features the use of a compressed fluid with less oxygen content, more specifically a compressed air containing 0.1 to 15 percent by volume of oxygen.

In addition to oxygen, the compressed fluid used herein may contain an inert gas such as nitrogen, argon or helium, carbon dioxide, hydrocarbon gas, fluorocarbon, hydrofluorocarbon, hydrochlorofluorocarbon or chlorofluorocarbon which may be used alone or in combination. Alternatively, an exhaust gas mixture may be used. These gas components containing oxygen may be supplied from a generator or a steel cylinder.

The upper limit content of oxygen is 15 percent by volume or less, preferably 10 percent by volume or less, more preferably 5 percent by volume or less, most preferably 3 percent by volume or less in view of processability. The lower limit content is 0.1 percent by volume or more, preferably 0.12 percent by volume or more, most preferably 0.15 percent by volume or more. An oxygen content lower than the lower limit would cause a reduction in the adsorptivity of the oil and thus would lead to the possibility that processing properties may not be improved.

The pressure to be applied to the compressed fluid in the minimal quantity lubrication cutting and grinding method is adjusted to such a pressure that the oil is not so scattered that it pollutes the atmosphere and a mixed fluid of the oil and gas or liquid can sufficiently reach spots to be cut and ground. The temperature of the compressed fluid is usually adjusted to room temperature (on the order of 25° C.) or from room temperature to −50° C.

In the minimal quantity lubrication cutting and grinding method of the present invention, most excellent effects can be obtained with an oil composition containing an ester as the minimal quantity lubrication cutting and grinding oil. The ester may be a natural product (usually those contained in natural animal or vegetable fats) or a synthesized product. In the present invention, a synthetic ester is preferably used in view of stability of the resulting oil composition or uniformity of the ester component.

The alcohol constituting the ester may be a monohydric alcohol or polyhydric alcohol. The acid constituting the ester may be a monobasic acid or polybasic acid.

The monohydric alcohol may be any of those having 1 to 24, preferably 1 to 12, more preferably 1 to 8 carbon atoms, and such alcohols may be of straight-chain or branched and saturated or unsaturated. Specific examples of the alcohols having 1 to 24 carbon atoms are methanol, ethanol, straight-chain or branched propanol, straight-chain or branched butanol, straight-chain or branched pentanol, straight-chain or branched hexanol, straight-chain or branched heptanol, straight-chain or branched octanol, straight-chain or branched nonanol, straight-chain or branched decanol, straight-chain or branched undecanol, straight-chain or branched dodecanol, straight-chain or branched tridecanol, straight-chain or branched tetradecanol, straight-chain or branched pentadecanol, straight-chain or branched hexadecanol, straight-chain or branched heptadecanol, straight-chain or branched octadecanol, straight-chain or branched nonadecanol, straight-chain or branched eicosanol, straight-chain or branched heneicosanol, straight-chain or branched tricosanol, straight-chain or branched tetracosanol, and mixtures thereof.

Examples of the polyhydric alcohol which may be used in the present invention include those of from dihydric to decahydric, preferably from dihydric to hexahydric. Specific examples of such alcohols are dihydric alcohols such as ethylene glycol, diethylene glycol, polyethylene glycol (trimers through pentadecamers of ethylene glycol), propylene glycol, dipropylene glycol, polypropylene glycol (trimers through pentadecamers of propylene glycol), 1,3-propane diol, 1,2-propane diol, 1,3-butane diol, 1,4-butane diol, 2-methyl-1,2-propane diol, 2-methyl-1,3-propane diol, 1,2-pentane diol, 1,3-pentane diol, 1,4-pentane diol, 1,5-pentane diol, and neopentyl glycol; polyhydric alcohols such as glycerin, polyglycerin (dimers through octamers of glycerine, such as diglycerin, triglycerine, and tetraglycerin), trimethylolalkane (trimethylolethane, trimethylolpropane, and trimethylolbutane), and dimers through tetramers thereof, pentaerythritol and dimers through tetramers thereof, 1,2,4-butanetriol, 1,3,5-pentanetriol, 1,2,6-hexanetriol, 1,2,3,4-butanetetrol, sorbitol, sorbitan, sorbitol glycerin condensation products, adonitol, arabitol, xylytol, and mannitol; and saccharides such as xylose, arabinose, ribose, rhamnose, glucose, fructose, galactose, mannose, sorbose, cellobiose, maltose, isomaltose, trehalose, and sucrose; and mixtures thereof.

Among these polyhydric alcohols, preferred are dihydric- to hexahydric-alcohols such as ethylene glycol, diethylene glycol, polyethylene glycol (trimers through decamers of ethylene glycol), propylene glycol, dipropylene glycol, polypropylene glycol (trimers through decamers of propylene glycol), 1,3-propane diol, 2-methyl-1,2-propane diol, 2-methyl-1,3-propane diol, neopentyl glycol, glycerin, diglycerin, triglycerin, trimethylolalkane (trimethylolethane, trimethylolpropane, and trimethylolbutane) and dimers through tetramers thereof, pentaerythritol, dipentaerythritol, 1,2,4-butanetriol, 1,3,5-pentanetriol, 1,2,6-hexanetriol, 1,2,3,4-butanetetrol, sorbitol, sorbitan, sorbitol glycerin condensation products, adonitol, arabitol, xylytol, and mannitol, and mixtures thereof. More preferred are ethylene glycol, propylene glycol, neopentyl glycol, glycerin, trimethylol ethane, trimethylol propane, pentaerythritol, sorbitan, and mixtures thereof. Among these polyhydric alcohols, most preferred are neopentyl glycol, trimethylol ethane, trimethylol propane, pentaerythritol, and mixtures thereof because more improved heat/oxidation stability can be attained.

As mentioned above, the alcohol constituting the ester may be a monohydric- or polyhydric-alcohol but is preferably a polyhydric alcohol because it can provide excellent lubricity for cutting or grinding operation, and makes it easier to produce an oil which is lower in pour point and improved more in treatability during a winter season and in cold districts. Further, the use of an ester of a polyhydric alcohol is more effective in improving the accuracy in the finished surface of a workpiece and inhibiting the blade edges of tools from wearing.

The monobasic acid to be used in the present invention is a fatty acid having 2 to 24 carbon atoms, which may be of straight-chain or branched and saturated or unsaturated. Specific examples of the monobasic acid include saturated fatty acids such as acetic acid, propionic acid, straight-chain or branched butanoic acid, straight-chain or branched pentanoic acid, straight-chain or branched hexanoic acid, straight-chain or branched heptanoic acid, straight-chain or branched octanoic acid, straight-chain or branched nonanoic acid, straight-chain or branched decanoic acid, straight-chain or branched undecanoic acid, straight-chain or branched dodecanoic acid, straight-chain or branched tridecanoic acid, straight-chain or branched tetradecanoic acid, straight-chain or branched pentadecanoic acid, straight-chain or branched hexadecanoic acid, straight-chain or branched heptadecanoic acid, straight-chain or branched octadecanoic acid, straight-chain or branched hydroxyoctadecanoic acid, straight-chain or branched nonadecanoic acid, straight-chain or branched eicosanoic acid, straight-chain or branched heneicosanoic acid, straight-chain or branched docosanoic acid, straight-chain or branched tricosanoic acid, and straight-chain or branched tetracosanoic acid; unsaturated fatty acids, such as acrylic acid, straight-chain or branched butenoic acid, straight-chain or branched pentenoic acid, straight-chain or branched hexenoic acid, straight-chain or branched heptenoic acid, straight-chain or branched octenoic acid, straight-chain or branched nonenoic acid, straight-chain or branched decenoic acid, straight-chain or branched undecenoic acid, straight-chain or branched dodecenoic acid, straight-chain or branched tridecenoic acid, straight-chain or branched tetradecenoic acid, straight-chain or branched pentadecenoic acid, straight-chain or branched hexadecenoic acid, straight-chain or branched heptadecenoic acid, straight-chain or branched octadecenoic acid, straight-chain or branched hydroxyoctadecenoic acid, straight-chain or branched nonadecenoic acid, straight-chain or branched eicosenic acid, straight-chain or branched heneicosenic acid, straight-chain or branched docosenoic acid, straight-chain or branched tricosenic acid, and straight-chain or branched tetracosenoic acid; and mixtures thereof. Among these monobasic acids, preferred are saturated fatty acids having 3 to 20 carbon atoms, unsaturated fatty acids having 3 to 22 carbon atoms, and mixtures thereof because they can enhance lubricity and treatability. More preferred are saturated fatty acids having 4 to 18 carbon atoms, unsaturated fatty acids having 4 to 18 carbon atoms, and mixtures thereof. In view of anti-sticking properties, preferred are saturated fatty acids having 4 to 18 carbon atoms.

Examples of the polybasic acid which may be used in the present invention include dibasic acids having 2 to 16 carbon atoms, and trimellitic acid. The dibasic acids having 2 to 16 carbon atoms may be of straight-chain or branched and saturated or unsaturated. Specific examples of the dibasic acids include ethanoic dibasic acid, propanoic dibasic acid, straight-chain or branched butanoic dibasic acid, straight-chain or branched pentanoic dibasic acid, straight-chain or branched hexanoic dibasic acid, straight-chain or branched heptanoic dibasic acid, straight-chain or branched octanoic dibasic acid, straight-chain or branched nonanoic dibasic acid, straight-chain or branched decanoic dibasic acid, straight-chain or branched undecanoic dibasic acid, straight-chain or branched dodecanoic dibasic acid, straight-chain or branched tridecanoic dibasic acid, straight-chain or branched tetradecanoic dibasic acid, straight-chain or branched heptadecanoic dibasic acid, straight-chain or branched hexadecanoic dibasic acid, straight-chain or branched hexenoic dibasic acid, straight-chain or branched heptenoic dibasic acid, straight-chain or branched octenoic dibasic acid, straight-chain or branched nonenoic dibasic acid, straight-chain or branched decenoic dibasic acid, straight-chain or branched undecenoic dibasic acid, straight-chain or branched dodecenoic dibasic acid, straight-chain or branched tridecenoic dibasic acid, straight-chain or branched tetradecenoic dibasic acid, straight-chain or branched heptadecenoic dibasic acid, and straight-chain or branched hexadecenoic dibasic acid; and mixtures thereof.

As described above, the acid constituting the ester may be a monobasic acid or a polybasic acid. However, preferred are monobasic acids because an ester which contributes to increase the viscosity index and improve the anti-sticking properties, is easily produced.

There is no particular restriction on the combination of an alcohol and an acid, forming the ester. Examples of the combination are as follows:

(1) an ester of a monohydric alcohol and a monobasic acid;
(2) an ester of a polyhydric alcohol and a monobasic acid;
(3) an ester of a monohydric alcohol and a polybasic acid;
(4) an ester of a polyhydric alcohol and a polybasic acid;
(5) a mixed ester of a mixture of a monohydric alcohol and a polyhydric alcohol and a polybasic acid;
(6) a mixed ester of a polyhydric alcohol, and a mixture of a monobasic acid and a polybasic acid; and
(7) a mixed ester of a mixture of a monohydric alcohol and a polyhydric alcohol, and a monobasic acid and a polybasic acid.

Among these combinations, preferred is (2) an ester of a polyhydric alcohol and a monobasic acid with the objective of obtaining more improved lubricity for cutting and grinding, improving the precision of the finished surface of a workpiece, obtaining an increased effect in preventing tool blade edges from wearing, enabling the easy production of oil with a low pour point and a higher viscosity index, enhancing the treatability in a winter season or in cold districts, and providing an excellent mist formability.

Examples of naturally-derived esters which may be used in the present invention include those from natural fats, for examples, vegetable oils such as palm oil, palm kernel oil, rapeseed oil, soybean oil, and high-oleic rapeseed oil or high-oleic sunflower oil with an increased content of oleic acid among the glyceride fatty acids resulting from breed improvement or gene recombination, and animal oils such as lard.

Among these naturally-derived esters, preferred are high-oleic natural fats with an increased oleic acid content, and particularly preferred are triesters of fatty acids and glycerin (hereinafter merely referred to as "triesters") wherein 40 to 98 percent by mass of the fatty acid is oleic acid in view of the stability of the resulting oil. The use of such triesters can achieve well-balanced lubricity and heat/oxidation stability at a higher level. The content of oleic acid in the fatty acids constituting the triesters is preferably 50 percent by mass or more, more preferably 60 percent by mass or more, more preferably 70 percent by mass or more with the objective of achieving well-balanced lubricity and heat/oxidation stability at a higher level. For the same reasons, the content is preferably 95 percent by mass or less, more preferably 90 percent by mass or less.

The ratio of oleic acid or linoleic acid or the like described below in the fatty acid constituting the above-described triester (hereinafter referred to as "constituting fatty acid") is measured in accordance with "Fatty Acid Composition" at Standard oils and fats analyzing test method 2. 4. 2 established by Japan Oil Chemists' Society.

There is no particular restriction on fatty acids constituting the triester, other than oleic acid as long as they do not impair lubricity and heat/oxidation stability. However, preferred are fatty acids having 6 to 24 carbon atoms. Such fatty acids having 6 to 24 carbon atoms may be saturated fatty acids or unsaturated fatty acids having 1 to 5 unsaturated bonds. The fatty acids may be of straight-chain or branched. Further, the fatty acids may have 1 to 3 hydroxyl groups (—OH) per molecules, in addition to carboxyl groups (—COOH). Specific examples of the fatty acids include caproic acid, caprylic acid, capric acid, lauric acid, myristic acid, palmitic acid, stearic acid, arachidic acid, behenic acid, lignoceric acid, lauroreic acid, myristoleic acid, palmitoleic acid, gadoleic acid, erucic acid, recinoleic acid, linoleic acid, linolenic acid, eleostearic acid, licanic acid, arachidonic acid, and clupanodonic acid. Among these fatty acids, preferred is linolenic acid with the objective of achieving both lubricity and heat/oxidation stability, and preferably 1 to 60 percent by mass (more preferably 2 to 50 percent by mass, more preferably 4 to 40 percent by mass) of the fatty acid constituting the triester is linolenic acid.

Further, in the above-described triester, 0.1 to 30 percent by mass (more preferably 0.5 to 20 percent by mass, more preferably 1 to 10 percent by mass) of the constituting fatty acid is preferably a fatty acid having 6 to 16 carbon atoms. A ratio of the fatty acid having 6 to 16 carbon atoms of less than 0.1 percent would cause a poor heat/oxidation stability while a ratio of more than 30 percent by mass would cause a poor lubricity.

The total unsaturation degree of the triester is preferably 0.3 or less, more preferably 0.2 or less. When the total unsaturation degree of the triester is greater than 0.3, the resulting oil composition would be poor in heat/oxidation stability. The total unsaturation degree referred herein is the total unsaturation degree measured in accordance with JIS K 1557-1970 "Plastics-Polyols for use in production of polyurethane-Part 3: Determination of degree of unsaturation by microtitration" using the same apparatus and operation method except for using a triester instead of a polyether for polyurethane.

The triester may be a synthesized triester or a natural oil such as a vegetable oil containing the triester as long as their oleic acid ratio in the constituting fatty acid satisfies the above-described requirement. However, it is preferable to use natural oils such as vegetable oils from the standpoint of safety to the human body. Preferable vegetable oils include rapeseed oil, sunflower oil, soybean oil, corn oil, and canola oil. Particularly preferred are sunflower oil, rapeseed oil, and soybean oil.

Although many of the natural vegetable oils have a total unsaturation degree of 0.3 or greater, it is possible to make the total unsaturation degree smaller by hydrogenation or the like during a refining process. Alternatively, a vegetable oil with a low total unsaturation degree can be easily produced with a gene recombination technique. Examples of vegetable oils having a total unsaturation degree of 0.3 or less and containing 70 percent by mass or more of oleic acid include high-oleic canola oils, and examples of those containing 80 percent by mass or more of oleic acid include high-oleic soybean oil, high-oleic sunflower oil, and high-oleic rapeseed oil.

In the present invention, when the ester is produced using a polyhydric alcohol as the alcohol component, the resulting ester may be a full ester all of which the hydroxyl groups have been esterified, or a partial ester part of which the hydroxyl groups remain unesterified. In the case of using a polybasic acid, the resulting organic acid ester may be a full ester all of which the carboxyl groups have been esterified, or a partial ester part of which the carboxyl groups remain unesterified.

The iodine number of the ester used in the present invention is preferably from 0 to 80, more preferably 0 to 60, more preferably 0 to 40, more preferably 0 to 20, most preferably 0 to 10. The bromine number of the ester is preferably from 0 to 50 g $Br_2$/100 g, more preferably from 0 to 30 g $Br_2$/100 g, more preferably from 0 to 20 g $Br_2$/100 g, most preferably from 0 to 10 g $Br_2$/100 g. The use of the ester with an iodine number and a bromine number within these ranges is likely to improve the anti-sticking properties of the resulting lubricating oil. The term "iodine number" used herein denotes a value measured by the indicator titration method defined by JIS K 0070 "Test methods for acid value, saponification value, ester value, iodine value, hydroxyl value, and unsaponifiable matter of chemical products". The term "bromine number" used herein denotes a value measured in accordance with JIS K 2605 "Petroleum distillates and commercial aliphatic olefins-Determination of bromine number-Electrometric method".

In order to impart a more improved lubricity to the oil composition of the present invention, the hydroxyl number and saponification number of the ester are preferably from 0.01 to 300 mgKOH/g and from 100 to 500 mgKOH/g, respectively. In order to impart a further more improved lubricity, the upper limit hydroxyl number of the ester is more preferably 200 mgKOH/g, most preferably 150 mgKOH/g while the lower limit hydroxyl group is more preferably 0.1 mgKOH/g, more preferably 0.5 mgKOH/g, more preferably 1 mgKOH/g, more preferably 3 mgKOH/g, and most preferably 5 mgKOH/g. The upper limit saponification number of the ester is 400 mgKOH/g while the lower limit saponification number is 200 mgKOH/g. The term "hydroxyl number" used herein denotes a value measured by the indicator titration method defined by JIS K 0070 "Test methods for acid value, saponification value, ester value, iodine value, hydroxyl value, and unsaponifiable matter of chemical products". The term "saponification number" used herein denotes a value measured by the indicator titration method defined by JIS K 2503 "Testing method of lubricating oil for aircraft".

There is no particular restriction on the kinematic viscosity of the ester used in the present invention. The kinematic viscosity at 40° C. is preferably 200 mm²/s or lower, more preferably 100 mm²/s or lower, more preferably 75 mm²/s or lower, particularly preferably 50 mm²/s or lower. The kinematic viscosity is preferably 1 mm²/s or greater, more preferably 3 mm²/s or greater, more preferably 5 mm²/s or greater.

There is no particular restriction on the pour point or viscosity index of the ester used in the present invention. The pour point is preferably −10° C. or lower, more preferably −20° C. or lower. The viscosity index is preferably 100 or greater and 200 or smaller.

In the present invention, the ester may be composed of only one of the above-described ester compounds or a mixture of two or more of these compounds.

The oil composition of the present invention may be composed of an ester only (that is the ester content is 100 percent by mass) or may be blended with other base oils or additives if necessary. However, the ester content is preferably 10 percent by mass or more, more preferably 20 percent by mass or more, more preferably 30 percent by mass or more, most preferably 50 percent by mass or more in view of biodegradability, that is, the easy decomposition of the oil components with microorganisms such as bacteria so that the environment of the surroundings can be maintained.

The oil composition of the present invention contains the above-described ester but may contain other conventional base oils for lubrication in such an amount that the properties of the oil composition are not significantly diminished.

Base oils which may be contained in the oil composition other than the ester may be mineral oils, synthetic oils or mixtures of two or more types of these oils.

Examples of mineral oils include paraffinic-, naphthenic-, normal paraffinic- and isoparaffinic-mineral oils produced by subjecting raw feedstocks such as lubricant fractions produced by atmospheric- or vacuum-distillation of paraffine base crude oil or mixed base crude oil, waxes (slack wax) produced through a lubricant dewaxing process and/or synthetic waxes (Fisher Tropsch waxes, GTL waxes) produced through a gas to liquid (GTL) process, to one or more refining treatments such as solvent deasphalting, solvent extraction, hydrocracking, hydroisomerization, solvent dewaxing, catalytic dewaxing, hydrorefining, sulfuric acid washing, and clay treatment.

Examples of synthetic oils include polyolefins such as propylene oligomer, polybutene, polyisobutylene, oligomers of α-olefins having 5 to 20 carbon atoms, cooligomers of ethylene and α-olefins having 5 to 20 carbon atoms and hydrogenated products thereof; alkylbenzenes such as monoalkylbenzenes, dialkylbenzenes and polyalkylbenzenes; alkylnaphthalenes such as monoalkylnaphthalenes, dialkylnaphthalenes and polyalkylnaphthalenes; polyoxyalkylene glycols; and polyphenyl ethers. These synthetic oils may be used alone or in combination.

There is no particular restriction on the content of these base oils. However, the content is preferably 90 percent by mass or less, more preferably 70 percent by mass or less, more preferably 50 percent by mass or less on the basis of the total mass of the oil composition.

The oil composition of the present invention preferably contains an oiliness improver with the objective of further enhancing cutting and grinding properties and extending the life of tools. Examples of such an oiliness improver include (B-1) alcohols, (B-2) carboxylic acids, (B-3) sulfides of unsaturated carboxylic acids, (B-4) compounds represented by formula (1) below, (B-5) compounds represented by formula (2) below, (B-6) polyoxyalkylene compounds, (B-7) hydrocarbyl ethers of polyhydric alcohols, and (B-8) amines:

(1)

wherein $R^1$ is a hydrocarbon group having 1 to 30 carbon atoms, a is an integer of 1 to 6, and b is an integer of 0 to 5;

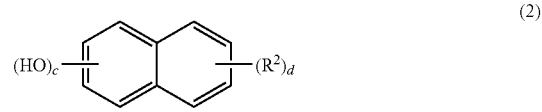

(2)

wherein $R^2$ is a hydrocarbon group having 1 to 30 carbon atoms, c is an integer of 1 to 6, and d is an integer of 0 to 5.

The alcohols referred to as (B-1) may be monohydric alcohols or polyhydric alcohols. With the objective of further improving cutting and grinding properties and extending the life of tools, the alcohols are preferably monohydric alcohols having 1 to 40 carbon atoms, more preferably alcohols having 1 to 25 carbon atoms, most preferably alcohols having 8 to 18 carbon atoms. Specific examples include those exemplified with respect to the alcohol constituting the base oil ester. These alcohols may be of straight-chain or branched and saturated or unsaturated. However, they are preferably saturated alcohols in view of anti-sticking properties.

The carboxylic acids referred to as (B-2) may be monobasic acids or polybasic acids. With the objective of further improving cutting and grinding properties and extending the life of tools, the carboxylic acids are preferably monobasic acids having 1 to 40 carbon atoms, more preferably carboxylic acids having 5 to 25 carbon atoms, most preferably carboxylic acids having 5 to 20 carbon atoms. Specific examples include those exemplified with respect to the acid constituting the base oil ester. These carboxylic acids may be of straight-chain or branched and saturated or unsaturated. However, they are preferably saturated carboxylic acids in view of anti-sticking properties.

Examples of (B-3) sulfides of unsaturated carboxylic acids include sulfides of oleic acid.

Examples of the hydrocarbon having 1 to 30 carbon atoms for $R^1$ in (B-4) compounds represented by formula (1) include straight-chain or branched alkyl groups having 1 to 30 carbon atoms, cycloalkyl groups having 5 to 7 carbon atoms, alkylcycloalkyl groups having 6 to 30 carbon atoms, straight-chain or branched alkenyl groups having 2 to 30 carbon atoms, aryl groups having 6 to 10 carbon atoms, alkylaryl groups having 7 to 30 carbon atoms, and arylalkyl groups having 7 to 30 carbon atoms. Among these hydrocarbon groups, $R^1$ is preferably a straight-chain or branched alkyl group having 1 to 30 carbon atoms, more preferably a straight-chain or branched alkyl group having 1 to 20 carbon atoms, more preferably a straight-chain or branched alkyl group having 1 to 10 carbon atoms, and most preferably a straight-chain or branched alkyl group having 1 to 4 carbon atoms. Specific examples of the straight-chain or branched alkyl group having 1 to 4 carbon atoms include methyl, ethyl, straight-chain or branched propyl, and straight-chain or branched butyl.

A hydroxyl group may be substituted at any position. However, in the case where the compound has two or more hydroxyl groups, they are preferably substituted at adjacent carbon atoms. The letter "a" is an integer preferably from of 1 to 3, more preferably 2. The letter "b" is an integer preferably from 0 to 3, more preferably 1 or 2. Example of the compounds of formula (1) is p-tert-butylcatechol.

Examples of the hydrocarbon group having 1 to 30 carbon atoms for $R^2$ in (B-5) compounds represented by formula (2) include those already exemplified with respect to $R^1$ in formula (1). Therefore, preferred examples are the same as those for $R^1$. A hydroxyl group may be substituted at any position. However, in the case where the compound has two or more hydroxyl groups, they are preferably substituted at adjacent carbon atoms. The letter "c" is an integer of preferably 1 to 3, more preferably 2. The letter "d" is an integer of preferably 0 to 3, more preferably 1 or 2. Examples of the compound of formula (2) are 2,2-dihydroxynaphthalene and 2,3-dihydroxynaphthalene.

Examples of (B-6) polyoxyalkylene compounds include those represented by the following formula (3) or (4):

$$R^3O-(R^4O)_e-R^5 \quad (3)$$

wherein $R^3$ and $R^5$ are each independently hydrogen or a hydrocarbon group having 1 to 30 carbon atoms, $R^4$ is an alkylene group having 2 to 4 carbon atoms, and e is such an integer that the number-average molecular weight is from 100 to 3,500; and $$A-[(R^6O)_f-R^7]_g \quad (4)$$

wherein A is a residue resulting from removal of all or part of the hydrogen atoms of the hydroxyl groups of a polyhydric alcohol having 3 to 10 hydroxyl groups, $R^6$ is an alkylene group having 2 to 4 carbon atoms, $R^7$ is hydrogen or a hydrocarbon group having 1 to 30 carbon atoms, f is such an integer that the number-average molecular weight is from 100 to 3,500, and g indicates the same number as that of the removed hydrogen.

At least either one of $R^3$ or $R^5$ is preferably hydrogen. Examples of hydrocarbon groups having 1 to 30 carbon atoms for $R^3$ and $R^5$ include those already exemplified with respect to $R^1$, and thus preferable examples are the same as those for $R^1$. Specific examples of the alkylene group having 2 to 4 carbon atoms for $R^4$ are ethylene, propylene (methylethylene), and butylene (ethylethylene). The letter "e" is such an integer that the number-average molecular weight is from 300 to 2,000, preferably 500 to 1,500.

Specific examples of the polyhydric alcohol having 3 to 10 hydroxyl groups forming the residue A include polyhydric alcohols such as glycerin, polyglycerin (dimers through tetramers of glycerin, such as diglycerin, triglycerin, and tetraglycerin), trimethylolalkanes (trimethylolethane, trimethylolpropane, trimethylolbutane) and dimers through tetramers thereof, pentaerythritol, dipentaerythritol, 1,2,4-butanetriol, 1,3,5-pentanetriol, 1,2,6-hexanetriol, 1,2,3,4-butanetetrol, sorbitol, sorbitan, sorbitol glycerin condensation products, adonitol, arabitol, xylitol, mannitol, iditol, talitol, dulcitol, and allitol; and saccharides such as xylose, arabinose, ribose, rhamnose, glucose, fructose, galactose, mannose, sorbose, cellobiose, maltose, isomaltose, trehalose, and sucrose. Among these, preferred are glycerin, polyglycerin, trimethylolalkanes and dimers through tetramers thereof, pentaerythritol, dipentaerythritol, sorbitol, and sorbitan.

Examples of the alkylene group having 2 to 4 carbon atoms for $R^6$ include those already exemplified with respect to $R^4$ in formula (3). Examples of the hydrocarbon group having 1 to 30 carbon atoms for $R^7$ include those already exemplified with respect to $R^1$ in formula (1) and thus preferable examples are the same as those for $R^1$. Preferably, at least one of the $R^7$ groups the number of which is expressed by g is preferably hydrogen, more preferably all of the $R^7$ groups are hydrogen. The letter "f" is such an integer that the number-average molecular weight is from 300 to 2,000, more preferably from 500 to 1,500.

Examples of the polyhydric alcohol constituting (B-7) hydrocarbyl ethers of polyhydric alcohols include those already exemplified with respect to the ester, and thus preferable examples are the same as those exemplified with respect to the ester. The polyhydric alcohol is most preferably glycerin with the objective of inhibiting a workpiece from adhering on tools and processing resistance from increasing to achieve excellent cutting and grinding properties and the extended life of the tools.

Examples of (B-7) hydrocarbyl ethers of polyhydric alcohols include those produced by converting the whole or part of the hydroxyl groups by hydrocarbyl etherification. With the objective of inhibiting a workpiece from adhering on tools and working resistance from increasing to achieve excellent cutting and grinding properties and the extended life of the tools, preferred are those wherein a part of the hydroxyl groups is hydrocarbyl-etherified (partial etherified product). The hydrocarbyl group referred herein is a hydrocarbon group having 1 to 24 carbon atoms, such as alkyl groups having 1 to 24 carbon atoms, alkenyl groups having 2 to 24 carbon atoms, cycloalkyl groups having 5 to 7 carbon atoms, alkylcycloalkyl groups having 6 to 11 carbon atoms, aryl group having 6 to 10 carbon atoms, alkylaryl groups having 7 to 18 carbon atoms, and arylalkyl groups having 7 to 18 carbon atoms.

Examples of the alkyl groups having 1 to 24 carbon atoms include methyl, ethyl, n-propyl, isopropyl, n-butyl, isobutyl, sec-butyl, tert-butyl, straight-chain or branched pentyl, straight-chain or branched hexyl, straight-chain or branched heptyl, straight-chain or branched octyl, straight-chain or branched nonyl, straight-chain or branched decyl, straight-chain or branched undecyl, straight-chain or branched dodecyl, straight-chain or branched tridecyl, straight-chain or branched tetradecyl, straight-chain or branched pentadecyl, straight-chain or branched hexadecyl, straight-chain or branched heptadecyl, straight-chain or branched octadecyl, straight-chain or branched nonadecyl, straight-chain or branched eicosyl, straight-chain or branched heneicosyl, straight-chain or branched docosyl, straight-chain or branched tricosyl and straight-chain or branched tetracosyl groups.

Examples of the alkenyl groups having 2 to 24 carbon atoms include vinyl, straight-chain or branched propenyl, straight-chain or branched butenyl, straight-chain or branched pentenyl, straight-chain or branched hexenyl, straight-chain or branched heptenyl, straight-chain or branched octenyl, straight-chain or branched nonenyl, straight-chain or branched decenyl, straight-chain or branched undecenyl, straight-chain or branched dodecenyl, straight-chain or branched tridecenyl, straight-chain or branched tetradecenyl, straight-chain or branched pentadecenyl, straight-chain or branched hexadecenyl, straight-chain or branched heptadecenyl, straight-chain or branched octadecenyl, straight-chain or branched nonadecenyl, straight-chain or branched eicosenyl, straight-chain or branched heneicosenyl, straight-chain or branched docosenyl, straight-chain or branched tricosenyl and straight-chain or branched tetracosenyl groups.

Examples of the cycloalkyl groups having 5 to 7 carbon atoms include cyclopentyl, cyclohexyl and cycloheptyl groups. Examples of the alkylcycloalkyl groups having 6 to 11 carbon atoms include methylcyclopentyl, dimethylcyclopentyl (including all structural isomers), methylethylcyclopentyl (including all structural isomers), diethylcyclopentyl (including all structural isomers), methylcyclohexyl, dimethylcyclohexyl (including all structural isomers), methylethylcyclohexyl (including all structural isomers), diethylcyclohexyl (including all structural isomers), methylcycloheptyl, dimethylcycloheptyl (including all structural isomers), methylethylcycloheptyl (including all structural isomers) and diethylcycloheptyl groups (including all structural isomers).

Examples of the aryl groups having 6 to 10 carbon atoms include phenyl and naphthyl groups. Examples of the alkylaryl groups having 7 to 18 carbon atoms include tolyl (including all structural isomers), xylyl (including all structural isomers), ethylphenyl (including all structural isomers), straight-chain or branched propylphenyl (including all structural isomers), straight-chain or branched butylphenyl (including all structural isomers), straight-chain or branched pentylphenyl (including all structural isomers), straight-chain or branched hexylphenyl (including all structural isomers), straight-chain or branched heptylphenyl (including all structural isomers), straight-chain or branched octylphenyl (including all structural isomers), straight-chain or branched nonylphenyl (including all structural isomers), straight-chain or branched decylphenyl (including all structural isomers), straight-chain or branched undecylphenyl (including all structural isomers) and straight-chain or branched dodecylphenyl groups (including all structural isomers).

Examples of the arylalkyl groups having 7 to 18 carbon atoms include benzyl, phenylethyl, phenylpropyl (including propyl isomers), phenylbutyl (including butyl isomers), phenylpentyl (including pentyl isomers) and phenylhexyl groups (including hexyl isomers).

With the objective of inhibiting a workpiece from adhering on tools and processing resistance from increasing to achieve excellent cutting and grinding properties and the extended life of tools, preferred among these groups are straight-chain or branched alkyl groups having 2 to 18 carbon atoms and straight-chain or branched alkenyl groups having 2 to 18 carbon atoms, and more preferred are straight-chain or branched alkyl groups and oleyl group (residue obtained by removing the hydroxyl group from oleyl alcohol).

Monoamines are preferably used as (B-8) amines. The carbon number of the monoamines is preferably from 6 to 24, more preferably from 12 to 24. The carbon number referred herein is the total carbon number of carbon atoms contained in the monoamine. When a monoamine has two or more hydrocarbon groups, the carbon number refers to the total carbon number thereof.

The monoamines used in the present invention may be primary monoamines, secondary monoamines, or tertiary monoamines. However, the monoamines are preferably primary monoamines with the objective of inhibiting a workpiece from adhering on tools and processing resistance from increasing to achieve excellent cutting and grinding properties and the extended life of tools.

Examples of hydrocarbon groups bonded to the nitrogen atom of the monoamine include alkyl, alkenyl, cycloalkyl, alkylcycloalkyl, aryl, alkylaryl, and arylalkyl groups. However, preferred are alkyl and alkenyl groups with the objective of inhibiting a workpiece from adhering on tools and processing resistance from increasing to achieve excellent cutting and grinding properties and the extended life of tools. The alkyl and alkenyl groups may be those of straight-chain or branched. However, preferred are those of straight-chain with the objective of inhibiting a workpiece from adhering on tools and processing resistance from increasing to achieve excellent cutting and grinding properties and the extended life of tools.

Specific preferable examples of monoamines which may be used in the present invention include hexylamine (including all isomers), heptylamine (including all isomers), octylamine (including all isomers), nonylamine (including all isomers), decylamine (including all isomers), undecylamine (including all isomers), dodecylamine (including all isomers), tridecylamine (including all isomers), tetradecylamine (including all isomers), pentadecylamine (including all isomers), hexadecylamine (including all isomers), heptadecylamine (including all isomers), octadecylamine (including all isomers), nonadecylamine (including all isomers), eicosylamine (including all isomers), heneicosylamine (including all isomers), docosylamine (including all isomers), tricosylamine (including all isomers), tetracosylamine (including all isomers), octadecenylamine (including all isomers) (including oleylamine and the like), and mixtures of two or more thereof. With the objective of inhibiting a workpiece from adhering on tools and processing resistance from increasing to achieve excellent cutting and grinding properties and the extended life of tools, preferred are primary monoamines having 12 to 24 carbon atoms, more preferred are primary monoamines having 14 to 20 carbon atoms, and more preferred are primary monoamines having 16 to 18 carbon atoms.

Only one type or a mixture of two or more types selected from the foregoing oiliness improvers (B-1) to (B-8) may be used in the present invention. Among these oiliness improvers, one type or a mixture of two or more types selected from (B-2) carboxylic acid oiliness improvers and (B-8) amine oiliness improvers are preferably used with the objective of inhibiting a workpiece from adhereing on tools and processing resistance from increasing to achieve excellent cutting and grinding properties and the extended life of tools.

There is no particular restriction on the content of the oiliness improver. However, the content is preferably 0.01 percent by mass or more, more preferably 0.05 percent by mass or more, more preferably 0.1 percent by mass or more on the basis of the total mass of the oil composition with the objective of inhibiting a workpiece from adhering on tools and processing resistance from increasing to achieve excellent cutting and grinding properties and the extended life of tools. In view of safety, the content is preferably 15 percent by mass or less, more preferably 10 percent by mass or less, more preferably 5 percent by mass or less on the basis of the total mass of the oil composition.

The oil composition of the present invention preferably contains an extreme pressure additive with the objective of inhibiting a workpiece from adhering on tools and processing resistance from increasing to achieve excellent cutting and grinding properties and the extended life of tools. The use of an extreme pressure additive in combination with the above-described oiliness improver makes it possible to inhibit a workpiece from adhering on tools and an processing resistance from increasing to achieve more excellent cutting and grinding properties and the extended life of tools because of their synergistic effect.

Examples of the extreme pressure additive include the following (C-1) sulfur compounds and (C-2) phosphorus compounds.

There is no particular restriction on (C-1) sulfur compounds as long as the properties of the oil composition are not impaired. However, preferred for use are dihydrocarbyl polysulfide, sulfidized esters, sulfide mineral oils, zinc dithiophosphate compounds, zinc dithiocarbaminate compounds, molybdenum dithiophosphate compounds and molybdenum dithiocarbaminate compounds.

Dihydrocarbyl polysulfides are sulfur-based compounds generally referred to as polysulfides or olefin sulfides, and specifically are represented by the following formula (5):

$$R^8-S_h-R^9 \quad (5)$$

wherein $R^8$ and $R^9$ may be the same or different and are each independently a straight chain or branched alkyl group having 3 to 20 carbon atoms, an aryl group having 6 to 20 carbon atoms, an alkylaryl group having 6 to 20 carbon atoms or an arylalkyl group having 6 to 20 carbon atoms, and h is an integer of 2 to 6, preferably 2 to 5.

Specific examples for $R^8$ and $R^9$ in formula (5) include straight-chain or branched alkyl groups such as n-propyl, isopropyl, n-butyl, isobutyl, sec-butyl, tert-butyl, straight-chain or branched pentyl, straight-chain or branched hexyl, straight-chain or branched heptyl, straight-chain or branched octyl, straight-chain or branched nonyl, straight-chain or branched decyl, straight-chain or branched undecyl, straight-chain or branched dodecyl, straight-chain or branched tridecyl, straight-chain or branched tetradecyl, straight-chain or branched pentadecyl, straight-chain or branched hexadecyl, straight-chain or branched heptadecyl, straight-chain or branched octadecyl, straight-chain or branched nonadecyl and straight-chain or branched eicosyl groups; aryl groups such as phenyl and naphthyl groups; alkylaryl groups such as tolyl (including all structural isomers), ethylphenyl (including all structural isomers), straight-chain or branched propylphenyl (including all structural isomers), straight-chain or branched butylphenyl (including all structural isomers), straight-chain or branched pentylphenyl (including all structural isomers), straight-chain or branched hexylphenyl (including all structural isomers), straight-chain or branched heptylphenyl (including all structural isomers), straight-chain or branched octylphenyl (including all structural isomers), straight-chain or branched nonylphenyl (including all structural isomers), straight-chain or branched decylphenyl (including all structural isomers), straight-chain or branched undecylphenyl (including all structural isomers), straight-chain or branched dodecylphenyl (including all structural isomers), xylyl (including all structural isomers), ethylmethylphenyl (including all structural isomers), diethylphenyl (including all structural isomers), di (straight-chain or branched) propylphenyl (including all structural isomers), di(straight-chain or branched)butylphenyl (including all structural isomers), methylnaphthyl (including all structural isomers), ethylnaphthyl (including all structural isomers), straight-chain or branched propylnaphthyl (including all structural isomers), straight-chain or branched butylnaphthyl (including all structural isomers), dimethylnaphthyl (including all structural isomers), ethylmethylnaphthyl (including all structural isomers), diethylnaphthyl (including all structural isomers), di(straight-chain or branched)propylnaphthyl (including all structural isomers) and di(straight-chain or branched) butylnaphthyl groups (including all structural isomers); and arylalkyl groups such as benzyl, phenylethyl (including all isomers) and phenylpropyl groups (including all isomers).

Among these groups, preferred for $R^8$ and $R^9$ in formula (5) include alkyl groups having 3 to 18 carbon atoms derived from propylene, 1-butene or isobutylene, and aryl, alkylaryl and arylalkyl groups each having 6 to 8 carbon atoms. Examples of these groups include alkyl groups such as isopropyl, branched hexyl derived from propylene dimer (including all branched isomers), branched nonyl derived from propylene trimer (including all branched isomers), branched dodecyl derived from propylene tetramer (including all branched isomers), branched pentadecyl derived from propylene pentamer (including all branched isomers), branched octadecyl derived from propylene hexamer (including all branched isomers), sec-butyl, tert-butyl, branched octyl derived from 1-butene dimer (including all branched isomers), branched octyl derived from isobutylene dimer (including all branched isomers), branched dodecyl derived from 1-butene trimer (including all branched isomers), branched dodecyl derived from isobutylene trimer (including all branched isomers), branched hexadecyl derived from 1-butene tetramer (including all branched isomers) and branched hexadecyl derived from isobutylene tetramer (including all branched isomers); alkylaryl groups such as phenyl, tolyl (including all structural isomers), ethylphenyl (including all structural isomers) and xylyl (including all structural isomers) and arylalkyl groups such as benzyl and phenylethyl (including all isomers).

With the objective of inhibiting a workpiece from adhering on tools and processing resistance from increasing to achieve excellent cutting and grinding properties and the extended life of tools, more preferred for each $R^8$ and $R^9$ in formula (5) are branched alkyl groups having 3 to 18 carbon atoms derived from ethylene or propylene, and particularly preferred are branched alkyl groups having 6 to 15 carbon atoms derived from ethylene or propylene.

Specific examples of the sulfidized esters include those produced by sulfidizing vegetable fats such as beef tallow, lard, fish oil, rapeseed oil and soybean oil; unsaturated fatty acid esters obtained by reacting unsaturated fatty acids (including oleic acid, linoleic acid and fatty acids extracted from the aforementioned animal and vegetable fats) and various alcohols; as well as mixtures thereof, by any desired methods.

The sulfide mineral oil referred herein is a mineral oil in which simple sulfur is dissolved. There is no particular restriction on the mineral oil for use in the sulfide mineral oil. However, specific examples include paraffinic mineral oils and naphthenic mineral oils produced by refining lubricating oil fractions that are produced by atmospheric distillation and vacuum distillation of crude oil, by one of or an appropriate combination of two or more of refining treatments such as solvent deasphalting, solvent extraction, hydrocracking, solvent dewaxing, catalytic dewaxing, hydrorefining, sulfuric acid washing, clay treatment or the like. The simple sulfur may be in the form of mass, powder or molten liquid but is preferably powder or molten liquid because it can be efficiently dissolved in the base oil. It is advantageous to mix the simple sulfur in molten liquid state and the base oil, both of which are liquid, because the dissolution operation can be completed in an extremely short period of time. However, the molten liquid simple sulfur must be treated at a temperature equal to or high than the melting point of the simple sulfur and thus requiring a special apparatus for heating because it must be handled under a high temperature atmosphere, accompanying danger. The molten liquid simple sulfur can not be treated easily. Whereas, the simple sulfur in powder form is preferably used because it is inexpensive and easy to handle and can be dissolved in a sufficiently short period of time. There is no particular restriction on the sulfur content in the sulfide mineral oil. However, the content is preferably from 0.05 to 1.0 percent by mass, more preferably from 0.1 to 0.5 percent by mass on the basis of the total mass of the sulfide mineral oil.

The above-mentioned zinc dithiophosphate compounds, zinc dithiocarbaminate compounds, molybdenum dithiophosphate compounds and molybdenum dithiocarbaminate compounds are compounds represented by the following formulas (6) to (9), respectively:

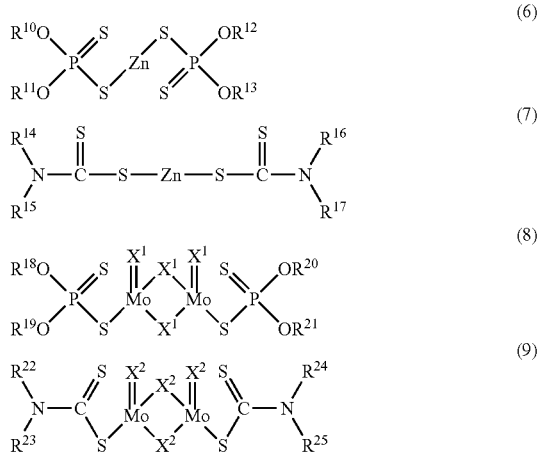

wherein $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$ and $R^{25}$ may be the same or different from each other and each independently a hydrocarbon having 1 or more carbon atom, and $X^1$ and $X^2$ are each independently oxygen or sulfur.

Specific examples of hydrocarbon groups for $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$ and $R^{25}$ include alkyl groups such as methyl, ethyl, propyl (including all branched isomers), butyl (including all branched isomers), pentyl (including all branched isomers), hexyl (including all branched isomers), heptyl (including all branched isomers), octyl (including all branched isomers), nonyl (including all branched isomers), decyl (including all branched isomers), undecyl (including all branched isomers), dodecyl (including all branched isomers), tridecyl (including all branched isomers), tetradecyl (including all branched isomers), pentadecyl (including all branched isomers), hexadecyl (including all branched isomers), heptadecyl (including all branched isomers), octadecyl (including all branched isomers), nonadecyl (including all branched isomers), eicosyl (including all branched isomers), heneicosyl (including all branched isomers), docosyl (including all branched isomers), tricosyl (including all branched isomers) and tetracosyl groups (including all branched isomers); cycloalkyl groups such as cyclopentyl, cyclohexyl and cycloheptyl groups; alkylcycloalkyl groups such as methylcyclopentyl (including all substituted isomers), ethylcyclopentyl (including all substituted isomers), dimethylcyclopentyl (including all substituted isomers), propylcyclopentyl (including all branched isomers and substituted isomers), methylethylcyclopentyl (including all substituted isomers), trimethylcyclopentyl (including all substituted isomers), butylcyclopentyl (including all branched isomers and substituted isomers), methylpropylcyclopentyl (including all branched isomers and substituted isomers), diethylcyclopentyl (including all substituted isomers), dimethylethylcyclopentyl (including all substituted isomers), methylcyclohexyl (including all substituted isomers), ethylcyclohexyl (including all substituted isomers), dimethylcyclohexyl (including all substituted isomers), propylcyclohexyl (including all branched isomers and substituted isomers), methylethylcyclohexyl (including all substituted isomers), trimethylcyclohexyl (including all substituted isomers), butylcyclohexyl (including all branched isomers and substituted isomers), methylpropylcyclohexyl (including all branched isomers and substituted isomers), diethylcyclohexyl (including all substituted isomers), dimethylethylcyclohexyl (including all substituted isomers), methylcycloheptyl (including all substituted isomers), ethylcycloheptyl (including all substituted isomers), dimethylcycloheptyl (including all substituted isomers), propylcycloheptyl (including all branched isomers and substituted isomers), methylethylcycloheptyl (including all substituted isomers), trimethylcycloheptyl (including all substituted isomers), butylcycloheptyl (including all branched isomers and substituted isomers), methylpropylcycloheptyl (including all branched isomers and substituted isomers), diethylcycloheptyl (including all substituted isomers) and dimethylethylcycloheptyl groups (including all substituted isomers); aryl groups such as phenyl and naphthyl groups; alkylaryl groups such as tolyl (including all substituted isomers), xylyl (including all substituted isomers), ethylphenyl (including all substituted isomers), propylphenyl (including all branched isomers and substituted isomers), methylethylphenyl (including all substituted isomers), trimethylphenyl (including all substituted isomers), butylphenyl (including all branched isomers and substituted isomers), methylpropylphenyl (including all branched isomers and substituted isomers), diethylphenyl (including all substituted isomers), dimethylethylphenyl (including all substituted isomers), pentylphenyl (including all branched isomers and substituted isomers), hexylphenyl (including all branched isomers and substituted isomers), heptylphenyl (including all branched isomers and substituted isomers), octylphenyl (including all branched isomers and substituted isomers), nonylphenyl (including all branched isomers and substituted isomers), decylphenyl (including all branched isomers and substituted isomers), undecylphenyl (including all branched isomers and substituted isomers), dodecylphenyl (including all branched isomers and substituted isomers), tridecylphenyl (including all branched isomers and substituted isomers), tetradecylphenyl (including all branched isomers and substituted isomers), pentadecylphenyl (including all branched isomers and substituted isomers), hexadecylphenyl (including all branched isomers and substituted isomers), heptadecylphenyl (including all branched isomers and substituted isomers) and octadecylphenyl groups (including all branched isomers and substituted isomers); and arylalkyl groups such as benzyl, phenethyl, phenylpropyl (including all branched isomers) and phenylbutyl groups (including all branched isomers).

In the present invention, among the above-mentioned sulfur compounds, at least one type selected from the group consisting of dihydrocarbyl polysulfides and sulfidized esters is preferably used because it can inhibit a workpiece from adhering on tools and processing resistance from increasing and thus can achieve more improved cutting and grinding properties and the extended life of tools.

Examples of (C-2) phosphorus compounds include phosphoric acid esters, acidic phosphoric acid esters, acidic phosphoric acid ester amine salts, chlorinated phosphoric acid esters, phosphorous acid esters and phosphorothionates, as well as metal salts of phosphorus compounds represented by the following formula (10) or (11). These phosphorus compounds may also be esters of phosphoric acid, phosphorous acid or thiophosphoric acid with alkanols or polyether alcohols, or derivatives thereof:

$$R^{26}-X^3-P(X^4-R^{27})-X^5-R^{28} \quad (10)$$

wherein $X^3$, $X^4$ and $X^5$ may be the same or different from each other and are each independently oxygen or sulfur, at least two of $X^3$, $X^4$ and $X^5$ are oxygen, and $R^{26}$, $R^{27}$ and $R^{28}$ may be the same or different from each other and are each independently hydrogen or a hydrocarbon group having 1 to 30 carbon atoms;

$$R^{29}-X^6-P(=X^9)(X^7-R^{30})-X^8-R^{31} \quad (11)$$

wherein $X^6$, $X^7$, $X^8$ and $X^9$ may be the same or different from each other and are each independently oxygen or sulfur, at least three of $X^6$, $X^7$, $X^8$ and $X^9$ are oxygen, and $R^{29}$, $R^{30}$ and $R^{31}$ may be the same or different from each other and are each independently a hydrocarbon group having 1 to 30 carbon atoms.

Specific examples of the phosphorus acid esters include tributyl phosphate, tripentyl phosphate, trihexyl phosphate, triheptyl phosphate, trioctyl phosphate, trinonyl phosphate, tridecyl phosphate, triundecyl phosphate, tridodecyl phosphate, tritridecyl phosphate, tritetradecyl phosphate, tripentadecyl phosphate, trihexadecyl phosphate, triheptadecyl phosphate, trioctadecyl phosphate, trioleyl phosphate, triphenyl phosphate, tricresyl phosphate, trixylenyl phosphate, cresyldiphenyl phosphate, and xylenyldiphenyl phosphate.

Examples of the acidic phosphoric acid esters include monobutyl acid phosphate, monopentyl acid phosphate, monohexyl acid phosphate, monoheptyl acid phosphate, monooctyl acid phosphate, monononyl acid phosphate, monodecyl acid phosphate, monoundecyl acid phosphate, monododecyl acid phosphate, monotridecyl acid phosphate, monotetradecyl acid phosphate, monopentadecyl acid phosphate, monohexadecyl acid phosphate, monoheptadecyl acid phosphate, monooctadecyl acid phosphate, monooleyl acid phosphate, dibutyl acid phosphate, dipentyl acid phosphate, dihexyl acid phosphate, diheptyl acid phosphate, dioctyl acid phosphate, dinonyl acid phosphate, didecyl acid phosphate, diundecyl acid phosphate, didodecyl acid phosphate, ditridecyl acid phosphate, ditetradecyl acid phosphate, dipentadecyl acid phosphate, dihexadecyl acid phosphate, diheptadecyl acid phosphate, dioctadecyl acid phosphate, and dioleyl acid phosphate.

Examples of the acidic phosphoric acid ester amine salts include salts of amines such as methylamines, ethylamines, propylamines, butylamines, pentylamines, hexylamines, heptylamines, octylamines, dimethylamines, diethylamines, dipropylamines, dibutylamines, dipentylamines, dihexylamines, diheptylamines, dioctylamines, trimethylamines, triethylamines, tripropylamines, tributylamines, tripentylamines, trihexylamines, triheptylamine and trioctylamines of the aforementioned acidic phosphoric acid esters.

Examples of the chlorinated phosphoric acid esters include tris•dichloropropyl phosphate, tris•chloroethyl phosphate, tris•chlorophenyl phosphate, and polyoxyalkylene-bis[di (chloroalkyl)]phosphate.

Examples of the phosphorous acid esters include dibutyl phosphite, dipentyl phosphite, dihexyl phosphite, diheptyl phosphite, dioctyl phosphite, dinonyl phosphite, didecyl phosphite, diundecyl phosphite, didodecyl phosphite, dioleyl phosphite, diphenyl phosphite, dicresyl phosphite, tributyl phosphite, tripentyl phosphite, trihexyl phosphite, triheptyl phosphite, trioctyl phosphite, trinonyl phosphite, tridecyl phosphite, triundecyl phosphite, tridodecyl phosphite, trioleyl phosphite, triphenyl phosphite, and tricresyl phosphite.

Examples of the phosphorothionates include tributyl phosphorothionate, tripentyl phosphorothionate, trihexyl phosphorothionate, triheptyl phosphorothionate, trioctyl phosphorothionate, trinonyl phosphorothionate, tridecyl phosphorothionate, triundecyl phosphorothionate, tridodecyl phosphorothionate, tritridecyl phosphorothionate, tritetradecyl phosphorothionate, tripentadecyl phosphorothionate, trihexadecyl phosphorothionate, triheptadecyl phosphorothionate, trioctadecyl phosphorothionate, trioleyl phosphorothionate, triphenyl phosphorothionate, tricresyl phosphorothionate, trixylenyl phosphorothionate, cresyldiphenyl phosphorothionate, xylenyldiphenyl phosphorothionate, tris(n-propylphenyl)phosphorothionate, tris(isopropylphenyl)phosphorothionate, tris(n-butylphenyl) phosphorothionate, tris(isobutylphenyl)phosphorothionate, tris(s-butylphenyl)phosphorothionate and tris(t-butylphenyl) phosphorothionate.

For metal salts of phosphorus compounds represented by formula (10) or (11), examples of the hydrocarbon having 1 to 30 carbon atoms for $R^{26}$ to $R^{31}$ include alkyl, cycloalkyl, alkenyl, alkylcycloalkyl, aryl, alkylaryl and arylalkyl groups.

Examples of the alkyl groups include methyl, ethyl, propyl, butyl, pentyl, hexyl, heptyl, octyl, nonyl, decyl, undecyl, dodecyl, tridecyl, tetradecyl, pentadecyl, hexadecyl, heptadecyl and octadecyl groups (all of which may be straight-chain or branched).

Examples of the cycloalkyl groups include those having 5 to 7 carbon atoms such as cyclopentyl, cyclohexyl and cycloheptyl groups. Examples of the alkylcycloalkyl groups include those having 6 to 11 carbon atoms such as methylcyclopentyl, dimethylcyclopentyl, methylethylcyclopentyl, diethylcyclopentyl, methylcyclohexyl, dimethylcyclohexyl, methylethylcyclohexyl, diethylcyclohexyl, methylcycloheptyl, dimethylcycloheptyl, methylethylcycloheptyl and diethylcycloheptyl groups (of which the alkyl groups may bond to any position of the cycloalkyl groups).

Examples of the alkenyl group include butenyl, pentenyl, hexenyl, heptenyl, octenyl, nonenyl, decenyl, undecenyl, dodecenyl, tridecenyl, tetradecenyl, pentadecenyl, hexadecenyl, heptadecenyl and octadecenyl groups, (all of which may be of straight-chain or branched and the position of which the double bonds may vary).

Examples of the aryl groups include phenyl and naphtyl groups. Examples of the alkylaryl group include those having 7 to 18 carbon atoms, such as tolyl, xylyl, ethylphenyl, propylphenyl, butylphenyl, pentylphenyl, hexylphenyl, heptylphenyl, octylphenyl, nonylphenyl, decylphenyl, undecylphenyl, and dodecylphenyl groups, (of which the alkyl groups may be of straight-chain or branched and may bond to any position of the aryl groups).

Examples of the arylalkyl group include those having 7 to 12 carbon atoms, such as benzyl, phenylethyl, phenylpropyl, phenylbutyl, phenylpentyl, and phenylhexyl groups, (of which the alkyl groups may be straight-chain or branched).

The hydrocarbon groups having 1 to 30 carbon atoms for $R^{26}$ to $R^{31}$ are preferably alkyl groups having 1 to 30 carbon atoms or aryl groups having 6 to 24 carbon atoms, more preferably alkyl groups having 3 to 18 carbon atoms, more preferably alkyl groups having 4 to 12 carbon atoms.

$R^{26}$, $R^{27}$ and $R^{28}$ may be the same or different from each other and are each independently hydrogen or the above-mentioned hydrocarbons. However, preferably one to three, more preferably one or two, more preferably two of $R^{26}$, $R^{27}$ and $R^{28}$ are the above-mentioned hydrocarbons.

$R^{29}$, $R^{30}$ and $R^{31}$ may be the same or different from each other and are each independently hydrogen or the above-mentioned hydrocarbons. However, preferably one to three, more preferably one or two, more preferably two of $R^{29}$, $R^{30}$ and $R^{31}$ are the above-mentioned hydrocarbons.

For the phosphorus compound represented by formula (10), at least two of $X^3$ to $X^5$ are necessarily oxygen, and all of $X^3$ to $X^5$ are preferably oxygen.

For the phosphorus compound represented by formula (11), at least two of $X^6$ to $X^9$ are necessarily oxygen, and all of $X^6$ to $X^9$ are preferably oxygen.

Examples of the phosphorus compound represented by formula (10) include phosphorous acid and monothiophosphorous acid; phosphorous acid monoesters and monothiophosphorous acid monoesters containing one of the above-mentioned hydrocarbon groups having 1 to 30 carbon atoms, phosphorous acid diesters and monothiophosphorous acid diesters containing two of the above-mentioned hydrocarbon groups having 1 to 30 carbon atoms; phosphorous acid triesters and monothiophosphorous acid triesters containing three of the above-mentioned hydrocarbon groups having 1 to 30 carbon atoms; and mixtures thereof. Among these phosphorus compounds, preferred are phosphorous acid monoesters and phosphorous acid diesters, more preferred are phosphorous acid diesters.

Examples of the phosphorus compound represented by formula (11) include phosphoric acid and monothiophosphoric acid; phosphoric acid monoesters and monothiophosphoric acid monoesters containing one of the above-mentioned hydrocarbon groups having 1 to 30 carbon atoms, phosphoric acid diesters and monothiophosphoric acid diesters containing two of the above-mentioned hydrocarbon groups having 1 to 30 carbon atoms; phosphoric acid triesters and monothiophosphoric acid triesters containing three of the above-mentioned hydrocarbon groups having 1 to 30 carbon atoms; and mixtures thereof. Among these phosphoric compounds, preferred are phosphoric acid monoesters and phosphoric acid diesters, more preferred are phosphoric acid diesters.

Examples of the metal salts of the phosphorus compounds represented by formula (10) or (11) include salts produced by neutralization of all or a portion of the acidic hydrogens of the phosphorus compounds with a metal base. Examples of the metal base include metal oxides, metal hydroxides, metal carbonates, and metal chlorides. Specific examples of the metal of the metal base include alkali metals such as lithium, sodium, potassium and cesium, alkaline earth metals such as calcium, magnesium and barium and heavy metals such as zinc, copper, iron, lead, nickel, silver, and manganese. Among these metals, preferred are alkaline earth metals such as calcium and magnesium and zinc.

The above-described metal salts of phosphorus compounds vary in structure depending on the valence of metals and the number of OH or SH group of the phosphorus compounds. Therefore, there is no particular restriction on the structure of the metal salts of phosphorus compounds. For example, when 1 mol of zinc oxide is reacted with 2 mol of a phosphoric acid monoester (with one OH group), it is assumed that a compound with a structure represented by formula (12) below is obtained as the main component but polymerized molecules may also exist:

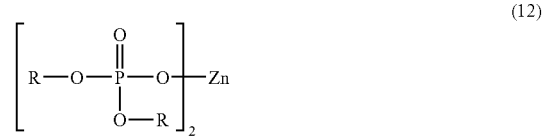

(12)

For another example, when 1 mol of zinc oxide is reacted with 1 mol of a phosphoric acid monoester (with two OH groups), it is assumed that a compound with a structure represented by e formula (13) below is obtained as the main component but polymerized molecules may also exist:

(13)

In the present invention, preferred among the above-mentioned phosphorus compounds are phosphoric acid esters, acidic phosphoric acid esters and acidic phosphoric acid ester amines because they can inhibit a workpiece from adhering on tools and processing resistance from increasing and thus can achieve more improved cutting and grinding properties and the extended life of tools.

The oil composition of the present invention may contain either one or both of (C-1) sulfur compounds and/or (C-2) phosphorus compounds. With the objective of inhibiting a workpiece from adhering on tools and processing resistance from increasing to achieve excellent cutting and grinding properties and the extended life of tools, the oil composition contains preferably (C-2) phosphorus compounds or both (C-1) sulfur compounds and (C-2) phosphorus compounds, more preferably both (C-1) sulfur compounds and (C-2) phosphorus compounds.

The content of the extreme pressure additive is preferably 0.005 percent by mass or more, more preferably 0.01 percent by mass or more, more preferably 0.05 percent by mass or more on the basis of the total mass of the composition with the objective of inhibiting a workpiece from adhering on tools and processing resistance from increasing to achieve excellent cutting and grinding properties and the extended life of tools. The content is preferably 15 percent by mass or less, 10 percent by mass or less, 7 percent by mass or less on the basis of the total mass of the composition with the objective of inhibiting abnormal wear.

In the present invention, either one of the above-described oiliness improver or extreme pressure additive may be used. However, the oiliness improver and extreme pressure additive are preferably used in combination with the objective of inhibiting a workpiece from adhering on tools and processing resistance from increasing to achieve excellent cutting and grinding properties and the extended life of tools.

The oil composition of the present invention preferably contains an organic acid salt with the objective of inhibiting a workpiece from adhering on tools and processing resistance from increasing to achieve excellent cutting and grinding properties and the extended life of tools. The organic acid salt is preferably any of sulfonates, phenates, salicylates and mixtures thereof. Examples of cationic components of these organic acid salts include alkali metals such as sodium and potassium; alkaline earth metals such as magnesium, calcium and barium; ammonia, amines such as alkyl group-containing alkylamines having an alkyl group having 1 to 3 carbon atoms (monomethylamine, dimethylamine, trimethylamine, monoethylamine, diethylamine, triethylamine, monopropylamine, dipropylamine, tripropylamine and the like), alkanolamines having an alkanol group having 1 to 3 carbon atoms (monomethanolamine, dimethanolamine, trimethanolamine, monoethanolamine, diethanolamine, triethanolamine, monopropanolamine, dipropanolamine, tripropanolamine and the like), and zinc. Among these components, preferred are alkali metals and alkaline earth metals, and particularly preferred is calcium. The use of an alkali metal or alkaline earth metal as the cationic component of the organic acid salt will likely obtain even higher lubricity.

The sulfonates may be those produced by any suitable method. For example, they may be alkali metal salts, alkaline earth metal salts, or amine salts, of alkyl aromatic sulfonic acids, produced by sulfonating alkyl aromatic compounds having a molecular weight of 100 to 1,500, preferably 200 to 700. Examples of the alkyl aromatic sulfonic acids include synthetic sulfonic acids such as those generally produced by sulfonating alkylaromatic compounds of a lubricating oil fraction of a mineral oil; petroleum sulfonic acids, so-called mahogany acid by-produced upon production of white oil; those produced by sulfonating an alkyl benzene having a straight-chain or branched alkyl group, such as those produced as a by-product from a plant for producing an alkyl benzene used as the raw material of a detergent or produced by alkylating polyolefin to benzene; and those produced by sulfonating alkylnaphthalenes such as dinonylnaphthalene. Further examples include neutral (normal salt) sulfonates produced by reacting the above-mentioned alkylaromatic sulfonic acids with alkali metal bases (alkali metal oxides or hydroxides), alkaline earth metal bases (alkaline earth metal oxides or hydroxides) or the above-mentioned amines (ammonia, alkylamines or alkanolamines); basic sulfonates produced by heating neutral (normal salt) sulfonates together with an excess of an alkali metal base, alkaline earth metal base or amine in the presence of water; carbonated overbased sulfonates (overbased salt) produced by reacting neutral (normal salt) sulfonates with alkali metal bases, alkaline earth metal bases or amines in the presence of carbon dioxide gas; berated overbased sulfonates produced by reacting neutral (normal salt) sulfonates with alkali metal bases, alkaline earth metal bases or amines and boric acid compounds such as boric acid and boric anhydride, or by reacting carbonated overbased sulfonates with boric acid compounds such as boric acid and boric anhydride; and mixtures of the foregoing compounds.

Specific examples of the phenates include neutral phenates produced by reacting alkylphenols having one or two alkyl groups having 4 to 20 carbon atoms with alkali metal bases (alkali metal oxides or hydroxides), alkaline earth metal bases (alkaline earth metal oxides or hydroxides) or the above-mentioned amines (ammonia, alkylamines, or alkanolamines) in the presence or in the absence of elemental sulfur; basic phenates produced by heating neutral phenates together with an excess of an alkali metal base, alkaline earth metal base or amine in the presence of water; carbonated overbased phenates produced by reacting neutral phenates with alkali metal bases, alkaline earth metal bases or amines in the presence of carbon dioxide gas; berated overbased phenates produced by reacting neutral phenates with alkali metal bases, alkaline earth metal bases or amines and boric acid compounds such as boric acid and boric anhydride, or by reacting carbonated overbased phenates with boric acid compounds such as boric acid and boric anhydride; and mixtures of the foregoing compounds.

Specific examples of the salicylates include neutral salicylates produced by reacting alkylsalicylic acids having one or two alkyl groups having 4 to 20 carbon atoms with alkali metal bases (alkali metal oxides or hydroxides), alkaline earth metal bases (alkaline earth metal oxides or hydroxides) or the above-mentioned amines (ammonia, alkylamines, or alkanolamines) in the presence or in the absence of elemental sulfur; basic salicylates produced by heating neutral salicylates together with an excess of an alkali metal base, alkaline earth metal base or amine in the presence of water; carbonated overbased salicylates produced by reacting neutral salicylates with alkali metal bases, alkaline earth metal bases or amines in the presence of carbon dioxide gas; berated overbased salicylates produced by reacting neutral salicylates with alkali metal bases, alkaline earth metal bases or amines and boric acid compounds such as boric acid and boric anhydride, or by reacting carbonated overbased salicylates with boric acid compounds such as boric acid and boric anhydride; and mixtures of the foregoing compounds.

The base number of the organic acid salt is preferably from 50 to 500 mgKOH/g, more preferably from 100 to 450 mgKOH/g. If the base number of the organic acid salt is less than 50 mgKOH/g, the lubricity-enhancing effect resulting from addition of the organic acid salt would tend to be insufficient, while a base number in excess of 500 mgKOH/g is also not preferable because it is difficult to produce and obtain organic acid salts with such a large base number. The term "base number" used herein denotes the base number [mgKOH/g] measured by the perchloric acid potentiometric titration method in accordance with section 7 of JIS K2501 "Petroleum products and lubricants-Determination of neutralization number".

The content of the organic acid salt is preferably from 0.1 to 30 percent by mass, more preferably from 0.5 to 25 percent by mass, more preferably from 1 to 20 percent by mass on the basis of the total mass of the oil composition. If the content of the organic acid salt is less than the lower limit, the effect of enhancing cutting and grinding properties and tool life resulting from inhibition of adhesion of a workpiece on tools and an increase in processing resistance obtained by addition of the organic acid salt would be insufficient. If the content is in excess of the upper limit, the resulting oil composition will be reduced in stability and thus would likely form deposits.

In the present invention, the organic acid salt may be used alone or in combination with other additives. With the objective of inhibiting a workpiece from adhering on tools and processing resistance from increasing to achieve excellent cutting and grinding properties and the extended life of tools, the organic acid salt is preferably used in combination with the above-described extreme pressure additive, and 3 types of components, i.e., a sulfur compound, a phosphorus compound and an organic acid salt are particularly preferably used in combination.

The oil composition of the present invention preferably contains an antioxidant. Addition of the antioxidant can inhibit sticking caused by decomposition of components of the oil composition and improve heat/oxidation stability.

Examples of the antioxidant include phenolic antioxidants, aminic antioxidants, zinc dithiophosphate-based antioxidants, and antioxidants used as food additives.

There is no particular restriction on the phenolic antioxidants since they may be any phenolic compounds that have been used as antioxidants for lubricating oils. Preferable examples include one or more alkylphenol compound selected from compounds represented by the following formulas (14) and (15):

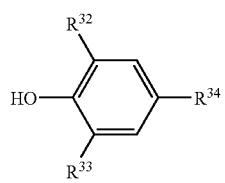
(14)

wherein $R^{32}$ is an alkyl group having 1 to 4 carbon atoms, $R^{33}$ is hydrogen or an alkyl group having 1 to 4 carbon atoms, and $R^{34}$ is hydrogen, an alkyl group having 1 to 4 carbon atoms or a group represented by formula (i) or (ii):

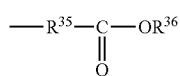
(i)

wherein $R^{35}$ is an alkylene group having 1 to 6 carbon atoms, and $R^{36}$ is an alkyl or alkenyl group having 1 to 24 carbon atoms;

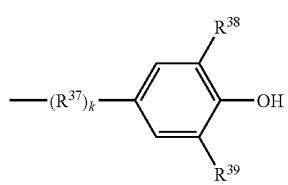
(ii)

wherein $R^{37}$ is an alkylene group having 1 to 6 carbon atoms, $R^{38}$ is an alkyl group having 1 to 6 carbon atoms, R39 is hydrogen or an alkyl group having 1 to 4 carbon atoms, and k is an integer of 0 or 1; and

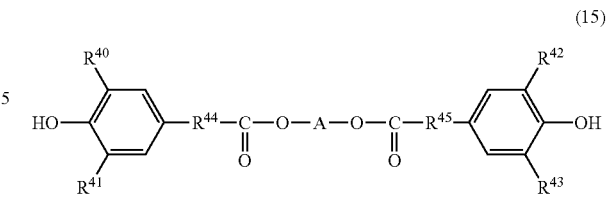
(15)

wherein $R^{40}$ and $R^{42}$ may be the same or different from each other and are each independently an alkyl group having 1 to 4 carbon atoms, $R^{41}$ and $R^{43}$ may be the same or different from each other and are each independently hydrogen or an alkyl group having 1 to 4 carbon atoms, $R^{44}$ and $R^{45}$ may be the same or different from each other and are each independently an alkylene group having 1 to 6 carbon atoms, and A is an alkylene group having 1 to 18 carbon atoms or a group represented by formula (iii):

(iii)

wherein $R^{46}$ and $R^{47}$ may be the same or different from each other and are each independently an alkylene group having 1 to 6 carbon atoms.

There is no particular restriction on the aminic antioxidants since they may be any aminic compounds that have been used as antioxidants for lubricating oils. Preferable examples include one or more aromatic amines selected from phenyl-α-naphthylamines or N-p-alkylphenyl-α-naphthylamines represented by the following formula (16), and p,p'-dialkyldiphenylamines represented by the following formula (17):

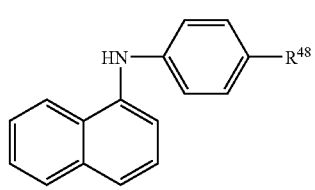
(16)

wherein $R^{48}$ is hydrogen or an alkyl group; and

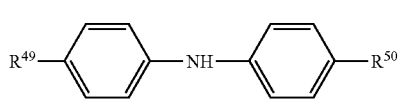
(17)

wherein $R^{49}$ and $R^{50}$ may be the same or different from each other and are each independently an alkyl group.

Specific examples of the aminic antioxidants include 4-butyl-4'-octyldiphenylamine, phenyl-α-naphthylamine, octylphenyl-α-naphthylamine, dodecylphenyl-α-naphthylamine, and mixtures thereof.

Specific examples of the zinc dithiophosphate-based antioxidants include zinc dithiophosphates represented by the following formula (18):

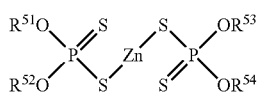
(18)

wherein $R^{51}$, $R^{52}$, $R^{53}$ and $R^{54}$ may be the same or different from each other and are each independently a hydrocarbon group.

Antioxidants that have been used as food additives may also be used. Although such antioxidants partially overlap with the above-mentioned phenolic antioxidants, examples of such antioxidants include 2,6-di-tert-butyl-p-cresol (DBPC), 4,4'-methylenebis(2,6-di-tert-butylphenol), 4,4'-bis(2,6-di-tert-butylphenol), 4,4'-thiobis(6-tert-butyl-o-cresol), ascorbic acid (vitamin C), ascorbic acid fatty acid esters, tocopherol (vitamin E), 3,5-di-tert-butyl-4-hydroxyanisole, 2-tert-butyl-4-hydroxyanisole, 3-tert-butyl-4-hydroxyanisole, 1,2-dihydro-6-ethoxy-2,2,4-trimethylquinoline (ethoxyquin), 2-(1,1-dimethyl)-1,4-benzenediol (TBHQ) and 2,4,5-trihydroxybutyrophenone (THBP).

Among these antioxidants, preferred are phenolic antioxidants, aminic antioxidants, and the above-mentioned antioxidants that have been used as food additives. When it is considered that biodegradability is important, preferred are the above-mentioned food additive antioxidants among which more preferred are ascorbic acid (vitamin C), ascorbic acid fatty acid esters, tocopherol (vitamin E), 2,6-di-tert-butyl-p-cresol (DBPC), 3,5-di-tert-butyl-4-hydroxyanisole, 2-tert-butyl-4-hydroxyanisole, 3-tert-butyl-4-hydroxyanisole, 1,2-dihydro-6-ethoxy-2,2,4-trimethylquinoline (ethoxyquin), 2-(1,1-dimethyl)-1,4-benzenediol (TBHQ) and 2,4,5-trihydroxybutyrophenone (THBP), among which more preferred are ascorbic acid (vitamin C), ascorbic acid fatty acid esters, tocopherol (vitamin E), 2,6-di-tert-butyl-p-cresol (DBPC) and 3,5-di-tert-butyl-4-hydroxyanisole.

There is no particular restriction on the content of the antioxidant. However, with the objective of maintaining excellent heat/oxidation stability, the content is preferably 0.01 percent by mass or more, more preferably 0.05 percent by mass or more, most preferably 0.1 percent by mass or more on the basis of the total mass of the oil composition. Since a further improvement in effects of addition of the antioxidant as balanced with the content can not be expected, the content is preferably 10 percent by mass or less, more preferably 5 percent by mass or less, most preferably 3 percent by mass or less.

The oil composition of the present invention may further contain various conventional additives in addition to those exemplified above. Examples of such additives include extreme pressure additives (including chlorine-based extreme pressure agents) other than the aforesaid phosphorus compounds and sulfur compounds; moistening agents such as diethyleneglycol monoalkylethers; film-forming agents such as acrylic polymers, paraffin wax, microwax, slack wax and polyolefin wax; water displacement agents such as fatty acid amine salts; solid lubricants such as graphite, fluorinated graphite, molybdenum disulfide, boron nitride and polyethylene powder; corrosion inhibitors such as amines, alkanolamines, amides, carboxylic acids, carboxylic acid salts, sulfonic acid salts, phosphoric acid, phosphoric acid salts and polyhydric alcohol partial esters; metal deactivators such as benzotriazoles and thiadiazoles; antifoaming agents such as methylsilicone, fluorosilicone and polyacrylates; and ashless dispersants such as alkenylsuccinic imides, benzylamines and polyalkenylamineaminoamides. There is no particular restriction on the contents of these known additives when used in combination. However, the additives are generally added in amounts so that the total content of thereof is from 0.1 to 10 percent by mass on the basis of the total mass of the oil composition.

As described above, the oil composition of the present invention may contain chlorine-based additives such as chlorine-based extreme pressure additives but preferably contains no such chlorine-based additives in view of improving safety and reducing burdens on the environment. The chlorine concentration of the oil composition is preferably 1,000 ppm by mass or less, more preferably 500 ppm by mass or less, more preferably 200 ppm by mass or less, particularly preferably 100 ppm by mass or less.

There is no particular restriction on the kinematic viscosity of the oil composition of the present invention. With the objective of making it easier to supply the oil to processing spots, the kinematic viscosity at 40° C. is preferably 200 mm$^2$/s or lower, more preferably 100 mm$^2$/s or lower, more preferably 75 mm$^2$/s or lower, most preferably 50 mm$^2$/s or lower. The lower limit kinematic viscosity is preferably 1 mm$^2$/s or greater, more preferably 3 mm$^2$/s or greater, most preferably 5 mm$^2$/s or greater.

As described above, the oil composition of the present invention is excellent in processing properties such as cutting and grinding properties and extended tool life and also in treatability. Therefore, the oil composition is suitably used in metal processing such as cutting and grinding with a minimal oil quantity lubricating system using a fluid with a lower oxygen content.

There is no particular restriction on the material of a workpiece to which the oil composition is applied. However, the oil composition is suitable for nonferrous metal processing and extremely excellent as a processing oil in particular for aluminum or aluminum alloys.

Description will be given of the method of minimal quantity lubrication cutting and grinding of the present invention.

FIG. 1 is an explanatory view illustrating one example of a working machine to which a minimal oil quantity lubrication cutting and grinding method is suitably applied. The working machine in FIG. 1 comprises a table 2 movable in the direction indicated by an arrow on a bed 1 and a tool rotatable in the direction indicated by an arrow, supported by a supporting means 10. The oil tank 12 contains the oil composition of the present invention. When a workpiece 3 placed on the table 2 was cut and ground, the oil composition of the present invention in the form of mist is supplied from an oil supplying means 13 to processing spots of the workpiece, together with a compressed fluid containing 0.1 to 15 percent by mass of oxygen, supplied from a compressed fluid supplying section 18.

APPLICABILITY IN THE INDUSTRY

The method of the present invention can improve cutting and grinding properties and extend the life of tools in a minimal quantity lubrication cutting and grinding processing and thus is significantly useful in the industry.

EXAMPLES

Hereinafter, the present invention will be described in more details by way of the following examples and comparative examples, which should not be construed as limiting the scope of the invention.

In Examples 1 to 24 and Comparative Example 1, oil compositions comprising the following base oils and additives were prepared.

(1) Base Oil

A1: triester of trimethylolpropane and oleic acid (kinematic viscosity at 40° C.: 46 mm$^2$/s)

A2: triester of trimethylolpropane and n-C$_8$/n-C$_{10}$ acid (kinematic viscosity at 40° C.: 20 mm$^2$/s)

A3: diester of neopentyl glycol and oleic acid (kinematic viscosity at 40° C.: 24 mm$^2$/s)
A4: diester of isodecyl alcohol and adipic acid (kinematic viscosity at 40° C.: 14 mm$^2$/s)
A5: triester of glycerin, n-C$_8$/n-C$_{10}$ acid and oleic acid (kinematic viscosity at 40° C.: 20 mm$^2$/s)
A6: high-oleic rapeseed oil (kinematic viscosity at 40° C.: 39 mm$^2$/s, acid composition: 64 percent by mass of oleic acid, 20 percent by mass of linoleic acid, 5 percent by mass of palmitic acid, 2 percent by mass of stearic acid, 9 percent by mass of n-C$_6$ to n-C$_{14}$ acid, total unsaturation degree: 0.26)

(2) Additives
B1: oleyl alcohol
B2: oleic acid
B3: oleyl amine
B4: glycerin monooleate
C1: sulfidized esters
C2: acidic phosphoric acid ester
D1: DBPC The gases used in tests are the following 7 types of gases (numerical values indicate volume %)
Gas 1: nitrogen (99.5)+oxygen (0.5)
Gas 2: nitrogen (99)+oxygen (1)
Gas 3: nitrogen (95)+oxygen (5)
Gas 4: nitrogen (90)+oxygen (10)
Gas 5: argon (99.5)+oxygen (0.5)
Gas 6: carbon dioxide (99)+oxygen (1)
Gas 7: nitrogen (80)+oxygen (20) (air)

In Examples 1 to 24 and Comparative Example 1, cutting and grinding properties were evaluated for various combinations of oil compositions and various gases. The apparatus and conditions used in this test are set forth in Table 1. The combinations were evaluated in terms of the following three items.

(1) Cutting and grinding resistance: measuring the resistance in the thrust direction with a three-component dynamometer manufactured by Kistler Japan Co., Ltd, fixed on the bottom of the workpiece. The average thrust resistance through the 100th hole is defined as cutting and grinding resistance.

(2) Evaluation of tool appearance: evaluating visually adhesion of the workpiece on the tool in 5 grades.
0: not deposited at all, 1: slightly deposited, 3: deposited, 4: considerably deposited, 5: deposited on the whole surface of the tool (3) Surface roughness: measuring the surface roughness Ra of the cross-section of the 100th processed hole.

The results are set forth in Table 2. When gases containing less oxygen were used, cutting and grinding resistance is smaller and the appearance of the tool was more excellent compared with the use of air.

TABLE 1

| | |
|---|---|
| Working machine | MB46VA manufactured by Ohkuma Corporation |
| Spindle speed (rpm) | 7000 |
| Spindle feed (mm/min) | 700 |
| Processing depth (mm) | 50 mm, no prepared hole, 100-hole continuous processing |
| Drill | φ6.0 mm Carbide tool with DLC coating for MQL (MDKH11584 manufactured by Sumitomo Electric Hardmetal Corp.) |
| Workpiece | AC8A |
| MQL supply system | MCA by TACO (MQL unit of external mixing type spindle-through type) simultaneous injection through oil wheel and collet |
| Oil discharge rate | 15 ml/h |
| Supply pressure/discharge pressure (MPa) | 05.-0.42/0.25-0.22 |

TABLE 2

| | | Example | | | | | | | | | |
|---|---|---|---|---|---|---|---|---|---|---|---|
| | | 1 | 2 | 3 | 4 | 5 | 6 | 7 | 8 | 9 | 10 |
| Base oil A1 | TMP-trioleate | 99.9 | | | | | | | | | |
| Base oil A2 | TMP-nC8, nC10 | | 100 | 100 | 100 | 100 | 100 | 100 | | | |
| Base oil A3 | NPG-dioleate | | | | | | | | 99.9 | 99.9 | 99.9 |
| Base oil A4 | DIDA | | | | | | | | | | |
| Base oil A5 | Glycerin triester | | | | | | | | | | |
| Base oil A6 | High-oleic rapeseed oil | | | | | | | | | | |
| Additive B1 | Oleyl alcohol | | | | | | | | | | |
| Additive B2 | Oleic acid | | | | | | | | | | |
| Additive B3 | Oleyl amine | | | | | | | | | | |
| Additive B4 | Glycerin monooleate | | | | | | | | | | |
| Additive C1 | Sulfidized ester | | | | | | | | | | |
| Additive C2 | Acidic phosphoric acid ester | | | | | | | | | | |
| Additive D1 | DBPC | 0.1 | | | | | | | 0.1 | 0.1 | 0.1 |
| Gas 1 | Nitrogen (0.5% oxygen) | | | ○ | | | | | | | |
| Gas 2 | Nitrogen (1% oxygen) | | ○ | | ○ | | | | ○ | | |
| Gas 3 | Nitrogen (5% oxygen) | | | | | ○ | | | | ○ | |
| Gas 4 | Nitrogen (10% oxygen) | | | | | | ○ | | | | ○ |
| Gas 5 | Argon (0.5% oxygen) | | | | | | | ○ | | | |
| Gas 6 | Carbon dioxide (1% oxygen) | | | | | | | ○ | | | |
| Gas 7 | Air (20% oxygen) | | | | | | | | | | |
| 40° C. kinematic viscosity mm$^2$/s | | 46 | 20 | 20 | 20 | 20 | 20 | 20 | 24 | 24 | 24 |
| Iodine number | | 80 | 0 | 0 | 0 | 0 | 0 | 0 | 80 | 80 | 80 |
| Cutting and grinding properties | Cutting and grinding resistance N·m | 123 | 116 | 121 | 125 | 131 | 117 | 119 | 124 | 126 | 130 |
| | Appearance evaluation | 0 | 0 | 0 | 0 | 1 | 0 | 0 | 0 | 0 | 1 |
| | Surface roughness μm | 1.32 | 1.14 | 1.26 | 1.51 | 1.48 | 1.62 | 1.4 | 1.29 | 1.6 | 1.52 |

TABLE 2-continued

| | | Example | | | | | | | | | |
|---|---|---|---|---|---|---|---|---|---|---|---|
| | | 11 | 12 | 13 | 14 | 15 | 16 | 17 | 18 | 19 | 20 |
| Base oil A1 | TMP-trioleate | | | | | | | | | | |
| Base oil A2 | TMP-nC8, nC10 | | | | | | 97 | 99 | 97 | 99 | 95 |
| Base oil A3 | NPG-dioleate | 99.9 | 99.9 | | | | | | | | |
| Base oil A4 | DIDA | | | 100 | | | | | | | |
| Base oil A5 | Glycerin triester | | | | 99.9 | | | | | | |
| Base oil A6 | High-oleic rapeseed oil | | | | | 99.9 | | | | | |
| Additive B1 | Oleyl alcohol | | | | | | 3 | | | | |
| Additive B2 | Oleic acid | | | | | | | 1 | | | |
| Additive B3 | Oleyl amine | | | | | | | | 3 | | |
| Additive B4 | Glycerin monooleate | | | | | | | | | 1 | |
| Additive C1 | Sulfidized ester | | | | | | | | | | 5 |
| Additive C2 | Acidic phosphoric acid ester | | | | | | | | | | |
| Additive D1 | DBPC | 0.1 | 0.1 | | 0.1 | 0.1 | | | | | |
| Gas 1 | Nitrogen (0.5% oxygen) | | | | | | | | | | |
| Gas 2 | Nitrogen (1% oxygen) | | | ○ | ○ | ○ | ○ | ○ | ○ | ○ | ○ |
| Gas 3 | Nitrogen (5% oxygen) | | | | | | | | | | |
| Gas 4 | Nitrogen (10% oxygen) | | | | | | | | | | |
| Gas 5 | Argon (0.5% oxygen) | ○ | | | | | | | | | |
| Gas 6 | Carbon dioxide (1% oxygen) | | ○ | | | | | | | | |
| Gas 7 | Air (20% oxygen) | | | | | | | | | | |
| 40° C. kinematic viscosity mm$^2$/s | | 24 | 24 | 14 | 20 | 38 | 20 | 20 | 21 | 20 | 21 |
| Iodine number | | 80 | 80 | 0 | 32 | 95 | 3 | 1 | 4 | 2 | 0 |
| Cutting and grinding properties | Cutting and grinding resistance N · m | 118 | 120 | 128 | 125 | 128 | 108 | 112 | 110 | 108 | 115 |
| | Appearance evaluation | 0 | 0 | 0 | 0 | 0 | 0 | 0 | 0 | 0 | 0 |
| | Surface roughness μm | 1.51 | 1.59 | 1.42 | 1.26 | 1.33 | 1.1 | 1.15 | 1.13 | 1.04 | 1.25 |

| | | Example | | | | Comparative example |
|---|---|---|---|---|---|---|
| | | 21 | 22 | 23 | 24 | 1 |
| Base oil A1 | TMP-trioleate | | | | | |
| Base oil A2 | TMP-nC8, nC10 | 97 | 96 | 94 | 91 | 100 |
| Base oil A3 | NPG-dioleate | | | | | |
| Base oil A4 | DIDA | | | | | |
| Base oil A5 | Glycerin triester | | | | | |
| Base oil A6 | High-oleic rapeseed oil | | | | | |
| Additive B1 | Oleyl alcohol | | | | | |
| Additive B2 | Oleic acid | | | | | |
| Additive B3 | Oleyl amine | | | | | |
| Additive B4 | Glycerin monooleate | | 1 | 1 | 1 | |
| Additive C1 | Sulfidized ester | | | 5 | 5 | |
| Additive C2 | Acidic phosphoric acid ester | 3 | 3 | | 3 | |
| Additive D1 | DBPC | | | | | |
| Gas 1 | Nitrogen (0.5% oxygen) | | | | | |
| Gas 2 | Nitrogen (1% oxygen) | ○ | ○ | ○ | ○ | |
| Gas 3 | Nitrogen (5% oxygen) | | | | | |
| Gas 4 | Nitrogen (10% oxygen) | | | | | |
| Gas 5 | Argon (0.5% oxygen) | | | | | |
| Gas 6 | Carbon dioxide (1% oxygen) | | | | | |
| Gas 7 | Air (20% oxygen) | | | | | ○ |
| 40° C. kinematic viscosity mm$^2$/s | | 21 | 21 | 21 | 21 | 20 |
| Iodine number | | 0 | 2 | 2 | 3 | 0 |
| Cutting and grinding properties | Cutting and grinding resistance N · m | 115 | 105 | 105 | 102 | 181 |
| | Appearance evaluation | 0 | 0 | 0 | 0 | 3 |
| | Surface roughness μm | 1.34 | 1.05 | 1.06 | 1.01 | 3.84 |

The amount of base oil and additives are mass %.

The invention claimed is:

1. A method of minimal quantity lubrication cutting and grinding, comprising supplying a compressed fluid containing 0.1 to 5 percent by volume of oxygen together with a cutting and grinding oil to processing spots of a workpiece, wherein the workpiece is a non-ferrous metal and the cutting and grinding oil contains an ester.

2. The method of minimal quantity lubrication cutting and grinding according to claim 1 wherein the cutting and grinding oil further contains an oiliness improver.

3. A minimal quantity lubrication cutting and grinding oil composition comprising an ester, wherein the composition is used in a method of minimal quantity lubrication cutting and grinding wherein a compressed fluid containing 0.1 to 5 percent by volume of oxygen is supplied to processing spots of a non-ferrous metal workpiece.

4. The method of minimal quantity lubricating cutting and grinding according to claim 1, wherein the non-ferrous metal comprises aluminum or an aluminum alloy.

* * * * *